United States Patent
Yamada et al.

(10) Patent No.: US 7,474,103 B2
(45) Date of Patent: Jan. 6, 2009

(54) STORAGE MEDIUM HAVING GAME PROGRAM STORED THEREON AND GAME APPARATUS

(75) Inventors: Yoichi Yamada, Kyoto (JP); Kenji Matsutani, Kyoto (JP); Toshio Iwawaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 203 days.

(21) Appl. No.: 11/654,650

(22) Filed: Jan. 18, 2007

(65) Prior Publication Data

US 2008/0119273 A1    May 22, 2008

(30) Foreign Application Priority Data

Nov. 17, 2006    (JP) .............................. 2006-312257

(51) Int. Cl.
*G01N 27/416* (2006.01)
*G01N 27/42* (2006.01)
*H02J 7/00* (2006.01)

(52) U.S. Cl. ................. 324/426; 324/425; 324/427; 324/428; 324/429; 324/433; 320/127; 320/132; 320/134

(58) Field of Classification Search ......... 324/425–429; 320/132, 134, 136
See application file for complete search history.

(56) References Cited

U.S. PATENT DOCUMENTS

2007/0066395 A1 * 3/2007 Harris et al. .................. 463/39

OTHER PUBLICATIONS

*Nintendo Game Cube Wireless Contoller WaveBird User's Manual*, Nintendo Co., Ltd., Dec. 5, 2002 (2 pages in Japanese).

* cited by examiner

*Primary Examiner*—Akm E Ullah
*Assistant Examiner*—Richard V Muralidar
(74) *Attorney, Agent, or Firm*—Nixon & Vanderhye P.C.

(57) ABSTRACT

At least one of continuous disconnection, intermittent disconnection, and temporary disconnection, of wireless communication between the input device and the game apparatus is detected. Remaining battery amount data representing a remaining battery amount of the input device is obtained via the wireless communication. It is determined that the power of the input device is insufficient based on that the wireless communication is detected to be disconnected and that the obtained remaining battery amount data represents a remaining battery amount of a predetermined level or lower. When it is determined that the power is insufficient, the power insufficiency is notified.

18 Claims, 15 Drawing Sheets

F I G. 7
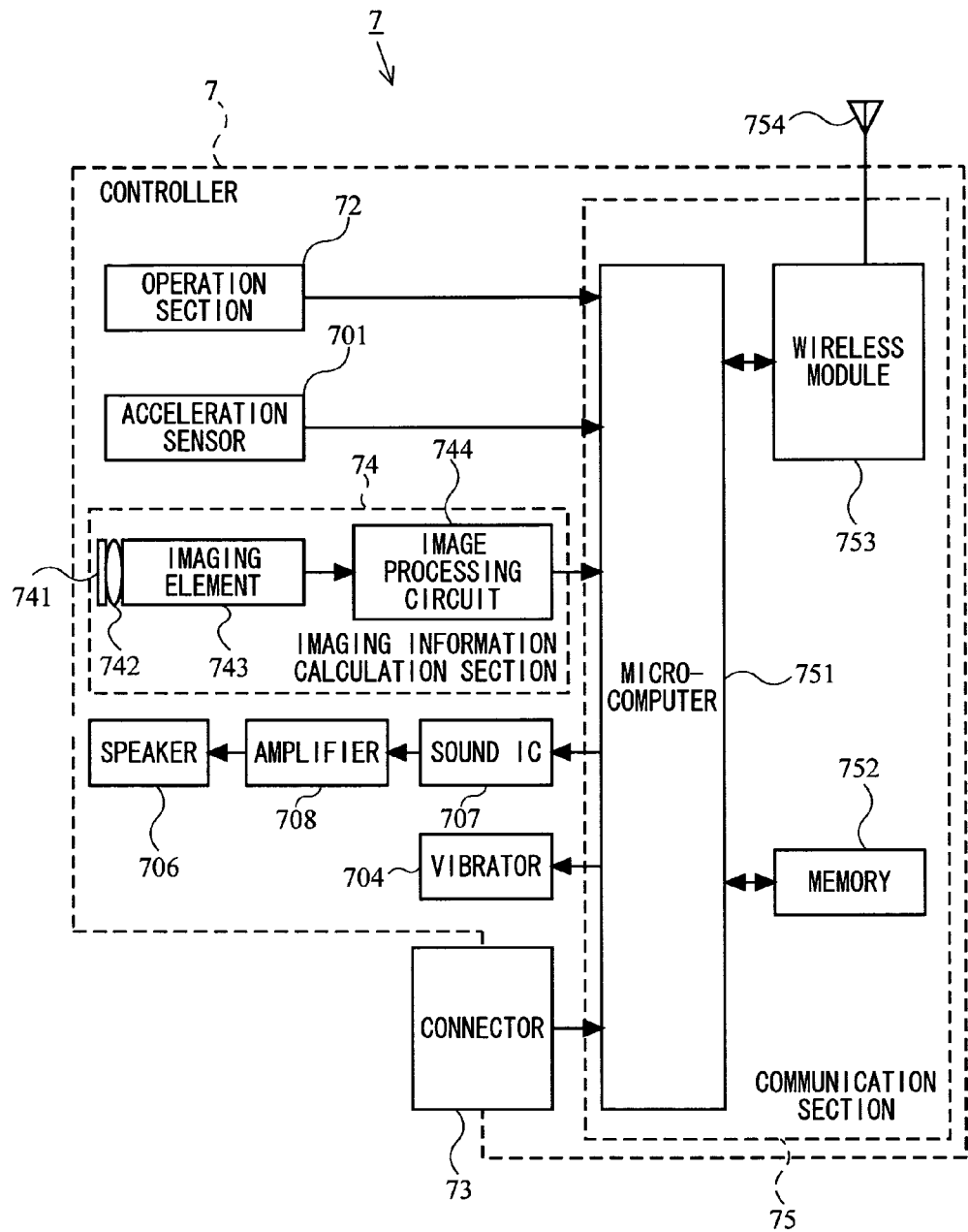

FIG. 8

THE REMOTE CONTROL NEEDS RE-CONNECTION.
PRESS THE A BUTTON.

THE BATTERY IS RUNNING DOWN.
RE-CONNECT THE REMOTE CONTROL WITH THE A
BUTTON AND CHECK THE REMAINING BATTERY
AMOUNT WITH THE HOME BUTTON MENU SCREEN.

2

US 7,474,103 B2

STORAGE MEDIUM HAVING GAME PROGRAM STORED THEREON AND GAME APPARATUS

CROSS REFERENCE TO RELATED APPLICATION

The disclosure of Japanese Patent Application No. 2006-312257, filed on Nov. 17, 2006, is incorporated herein by reference.

BACKGROUND OF THE INVENTION

1. Field of the Invention

The present invention relates to a storage medium having a game program stored thereon and a game apparatus, and more specifically to a storage medium having a game program stored thereon and a game apparatus which use an input device connected to the game apparatus main body via wireless communication.

2. Description of the Background Art

Conventionally, game apparatuses using an input device connected to a game apparatus main body via wireless communication have been developed as described in, for example, "Nintendo Game Cube Wireless Controller WaveBird User's Manual" (Nintendo Co., Ltd., Dec. 5, 2002 (hereinafter, referred to as non-patent document 1).

The input device described in non-patent document 1 is connected to a game apparatus main body via wireless communication. In general, an input device connected to a game apparatus main body via wireless communication, such as the input device described in non-patent document 1, cannot be supplied with power from the game apparatus main body. Therefore, such an input device has a built-in dry battery or a rechargeable battery. However, the power supply such as a dry battery or a rechargeable battery has a limited life. When the life has expired, i.e., the battery is dead, the built-in dry battery needs to be replaced with a new dry battery or the rechargeable battery needs to be recharged. The input device described in non-patent document 1 notifies a player that the dry battery needs to be replaced as follows. When the player turns the power switch on, the power lamp provided in the input device is lit up. As the dry battery is consumed, the power lamp gradually becomes dark. The input device urges the player to replace the dry battery with a new one while the battery still has a certain remaining amount therein.

However, the player playing a game with the game apparatus does not often visually check the input device held in his/her hand, and plays while watching the game image displayed on a display device. Although using the input device described in non-patent document 1, the player may continue playing without noticing that the power lamp is becoming gradually dark. Therefore, it often occurs that the player notices that the battery needs to be replaced only after the battery is dead and the game operation cannot be performed because there is no wireless communication between the game apparatus main body and the input device. When the player notices that the battery is dead, the wireless communication with the game apparatus main body cannot be satisfactorily performed any more. Therefore, the input device cannot, for example, instruct the game apparatus main body to stop the game. As a result, the play proceeds against the intention of the player until the player completes replacing or recharging the battery.

SUMMARY OF THE INVENTION

Therefore, an object of the present invention is to provide a storage medium having a game program stored thereon and a game apparatus capable of properly determining that the battery in an input device is running down.

The present invention has the following features to attain the object mentioned above. The reference numerals, the step numbers and the like in parentheses in this section of the specification indicate the correspondence with the embodiments described later for easier understanding of the present invention, and do not limit the present invention in any way.

A first aspect of the present invention is directed to a storage medium having a game program stored thereon executable by a computer (30) of a game apparatus (5) wirelessly communicably connected to an input device (7) including an electronic circuit having a wireless communication function and a battery for providing power to the electronic circuit. The game program causes the computer to act as disconnection detection means (CPU 30 for executing step 18; hereinafter only the step number will be mentioned), remaining battery amount data obtaining means (S57), power insufficiency determination means (S53), and notification means (S55). The disconnection detection means detects at least one of continuous disconnection, intermittent disconnection, and temporary disconnection, of wireless communication between the input device and the game apparatus. The remaining battery amount data obtaining means obtains remaining battery amount data representing a remaining battery amount of the input device via the wireless communication. The power insufficiency determination means determines that the power of the input device is insufficient based on that the wireless communication is detected to be disconnected by the disconnection detection means and that the remaining battery amount data obtained by the remaining battery amount data obtaining means represents a remaining battery amount of a predetermined level or lower. The notification means, when the power insufficiency determination means determines that the power is insufficient, notifies the power insufficiency.

In a second aspect based on the first aspect, the power insufficiency determination means determines that the power of the input device is insufficient when the disconnection detection means detects the temporary disconnection of the wireless communication, the remaining battery amount data obtained by the remaining battery amount data obtaining means represents a remaining battery amount of a predetermined level or lower, and further the disconnection detection means detects that the wireless communication is disconnected the second time within a predetermined time period after the temporary disconnection (S15, S53, S59).

In a third aspect based on the first aspect, the disconnection detection means detects the temporary disconnection of the wireless communication. The remaining battery amount data obtaining means obtains the remaining battery amount data from the input device only immediately after the disconnection detection means detects the temporary disconnection (S66).

In a fourth aspect based on the third aspect, the power insufficiency determination means determines that the power of the input device is insufficient when the disconnection detection means detects the temporary disconnection of the wireless communication, the remaining battery amount data obtained by the remaining battery amount data obtaining means represents a remaining battery amount of a predetermined level or lower, and further the disconnection detection means detects that the wireless communication is disconnected the second time within a predetermined time period after the temporary disconnection.

In a fifth aspect based on the first aspect, the disconnection detection means detects the intermittent disconnection of the wireless communication during a predetermine time period. The power insufficiency determination means determines that the power of the input device is insufficient when the disconnection detection means detects the intermittent disconnection of the wireless communication, and the remaining battery amount data obtained by the remaining battery amount data obtaining means represents a remaining battery amount of a predetermined level or lower.

In a sixth aspect based on the first aspect, the remaining battery amount obtaining means obtains the remaining battery amount data representing the remaining battery amount of the input device repeatedly as necessary via the wireless communication. The power insufficiency determination means determines that the power of the input device is insufficient when the disconnection detection means detects the continuous disconnection of the wireless communication, and the latest remaining battery amount data obtained by the remaining battery amount data obtaining means represents a remaining battery amount of a predetermined level or lower.

In a seventh aspect based on the first aspect, when the power insufficiency determination means determines that the power is insufficient, the notification means interrupts game processing which is being executed, stores game state data representing a state of the game in execution on a memory (33) included in the game apparatus, and notifies that the power is insufficient by displaying a message indicating the power insufficiency on a display device (2) with a game image provided by the game processing being stopped (S51, S52).

In an eighth aspect based on the first aspect, the notification means displays, on a display device for displaying a game image of a game which is being executed by the game apparatus, an image indicating that the power of the input device is insufficient.

In a ninth aspect based on the first aspect, the notification means outputs an audio signal or a sound effect indicating that the power of the input device is insufficient through a speaker (2a, 706) controllable by the game apparatus.

A tenth aspect of the present invention is directed to a game apparatus wirelessly communicably connected to an input device including an electronic circuit having a wireless communication function and a battery for providing power to the electronic circuit. The apparatus comprises wireless communication means, disconnection detection means, remaining battery amount data obtaining means, power insufficiency determination means, and notification means. The wireless communication means wirelessly communicates with the input device. The disconnection detection means detects at least one of continuous disconnection, intermittent disconnection, and temporary disconnection, of wireless communication with the input device. The remaining battery amount data obtaining means obtains remaining battery amount data representing a remaining battery amount of the input device via the wireless communication. The power insufficiency determination means determines that the power of the input device is insufficient based on that the wireless communication is detected to be disconnected by the disconnection detection means and that the remaining battery amount data obtained by the remaining battery amount data obtaining means represents a remaining battery amount of a predetermined level or lower. The notification means, when the power insufficiency determination means determines that the power is insufficient, notifies the power insufficiency.

In an eleventh aspect based on the tenth aspect, the power insufficiency determination means determines that the power of the input device is insufficient when the disconnection detection means detects the temporary disconnection of the wireless communication, the remaining battery amount data obtained by the remaining battery amount data obtaining means represents a remaining battery amount of a predetermined level or lower, and further the disconnection detection means detects that the wireless communication is disconnected the second time within a predetermined time period after the temporary disconnection.

In a twelfth aspect based on the tenth aspect, the disconnection detection means detects the temporary disconnection of the wireless communication. The remaining battery amount data obtaining means obtains the remaining battery amount data from the input device only immediately after the disconnection detection means detects the temporary disconnection.

In a thirteenth aspect based on the twelfth aspect, the power insufficiency determination means determines that the power of the input device is insufficient when the disconnection detection means detects the temporary disconnection of the wireless communication, the remaining battery amount data obtained by the remaining battery amount data obtaining means represents a remaining battery amount of a predetermined level or lower, and further the disconnection detection means detects that the wireless communication is disconnected the second time within a predetermined time period after the temporary disconnection.

In a fourteenth aspect based on the tenth aspect, the disconnection detection means detects the intermittent disconnection of the wireless communication during a predetermine time period. The power insufficiency determination means determines that the power of the input device is insufficient when the disconnection detection means detects the intermittent disconnection of the wireless communication, and the remaining battery amount data obtained by the remaining battery amount data obtaining means represents a remaining battery amount of a predetermined level or lower.

In a fifteenth aspect based on the tenth aspect, the remaining battery amount obtaining means obtains the remaining battery amount data representing the remaining battery amount of the input device repeatedly as necessary via the wireless communication. The power insufficiency determination means determines that the power of the input device is insufficient when the disconnection detection means detects the continuous disconnection of the wireless communication, and the latest remaining battery amount data obtained by the remaining battery amount data obtaining means represents a remaining battery amount of a predetermined level or lower.

In a sixteenth aspect based on the tenth aspect, when the power insufficiency determination means determines that the power is insufficient, the notification means interrupts game processing which is being executed, stores game state data representing a state of the game in execution on a memory included in the game apparatus, and notifies that the power is insufficient by displaying a message indicating the power insufficiency on a display device with a game image provided by the game processing being stopped.

In a seventeenth aspect based on the tenth aspect, the notification means displays, on a display device for displaying a game image of a game which is being executed by the game apparatus, an image indicating that the power of the input device is insufficient.

In an eighteenth aspect based on the tenth aspect, the notification means outputs an audio signal or a sound effect indicating that the power of the input device is insufficient through a speaker controllable by the game apparatus.

According to the first aspect, it is determined that the remaining battery amount of the input device is insufficient based on that the wireless communication has been disconnected and that the remaining battery amount has been lowered to equal to or less than a predetermined level. Therefore, the power insufficiency of the input device can be properly determined in accordance with the current use environment. For example, if it is determined that the power is insufficient only based on the remaining battery amount, a correct determination may not be provided due to the difference among individual apparatuses or the state of use. In this case, the battery may not be used even though there is still a usable battery amount. If it is determined that the power is insufficient only based on that the wireless communication has been disconnected, a correct determination may not be provided because of the use environment. In that case also, the battery is not used even if the there is still a sufficient usable battery amount.

According to the third aspect, the remaining battery amount of the input device is checked only immediately after the wireless communication is temporarily disconnected, not for every predetermined number of cycles. Therefore, the suppression of the wireless communication band, the processing load, the power consumption and the like can be alleviated.

According to the second or fourth aspect, it is determined that the power of the input device is insufficient when the wireless communication is detected to be temporarily disconnected, the remaining battery amount after that is equal to or less than a predetermined level, and further the wireless communication is disconnected again within a predetermined time period after the temporary disconnection. Therefore, it can be more properly determined that the disconnection of the wireless communication has occurred due to the insufficient battery amount.

According to the fifth aspect, it is determined that the power of the input device is insufficient based on the confirmation that the remaining battery amount of the input device has lowered to equal to or less than a predetermined level and the confirmation that at such a low level, the wireless communication may be disconnected a plurality of times within a predetermined time period under the current operation environment. In other words, it is determined that the power of the input device is insufficient in combined consideration of the remaining battery amount of the input device and the wireless communication state. Therefore, it can be properly determined that that the power of the input device is insufficient.

According to the sixth aspect, it is determined that the power of the input device is insufficient when the disconnection is continuous and further the latest remaining battery amount before the disconnection is equal to or less than a predetermined level. Therefore, it can be properly determined that the disconnection of the wireless communication has occurred due to the insufficient battery amount.

According to the seventh aspect, when the wireless communication with the input device is disconnected, the game is automatically interrupted, and the game state at that point is stored. Therefore, it does not occur that the game proceeds against the intention of the player until the player finishes replacing the dry battery or recharging the rechargeable battery of the input device.

According to the eighth aspect, an image indicating that the power is insufficient is displayed on the display device that the player watches while enjoying the game. Therefore, it does not occur that the player keeps playing without noticing the power insufficiency.

According to the ninth aspect, the information indicating the power insufficiency is output as an audio signal or a sound effect. Therefore, it does not occur that the player keeps playing without noticing the power insufficiency.

A game apparatus according to the present invention provides substantially the same effects as those of the above-described storage medium having the game program stored thereon.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a block diagram illustrating a structure of the controller 7 shown in FIG. 3;

FIG. 8 shows an exemplary image which is displayed on a display screen of a monitor 2 when the wireless communication is disconnected;

FIG. 9 shows an exemplary image which is displayed on a display screen of a monitor 2 when the wireless communication is disconnected due to an insufficient battery amount;

DESCRIPTION OF THE PREFERRED EMBODIMENTS

Figure 1:
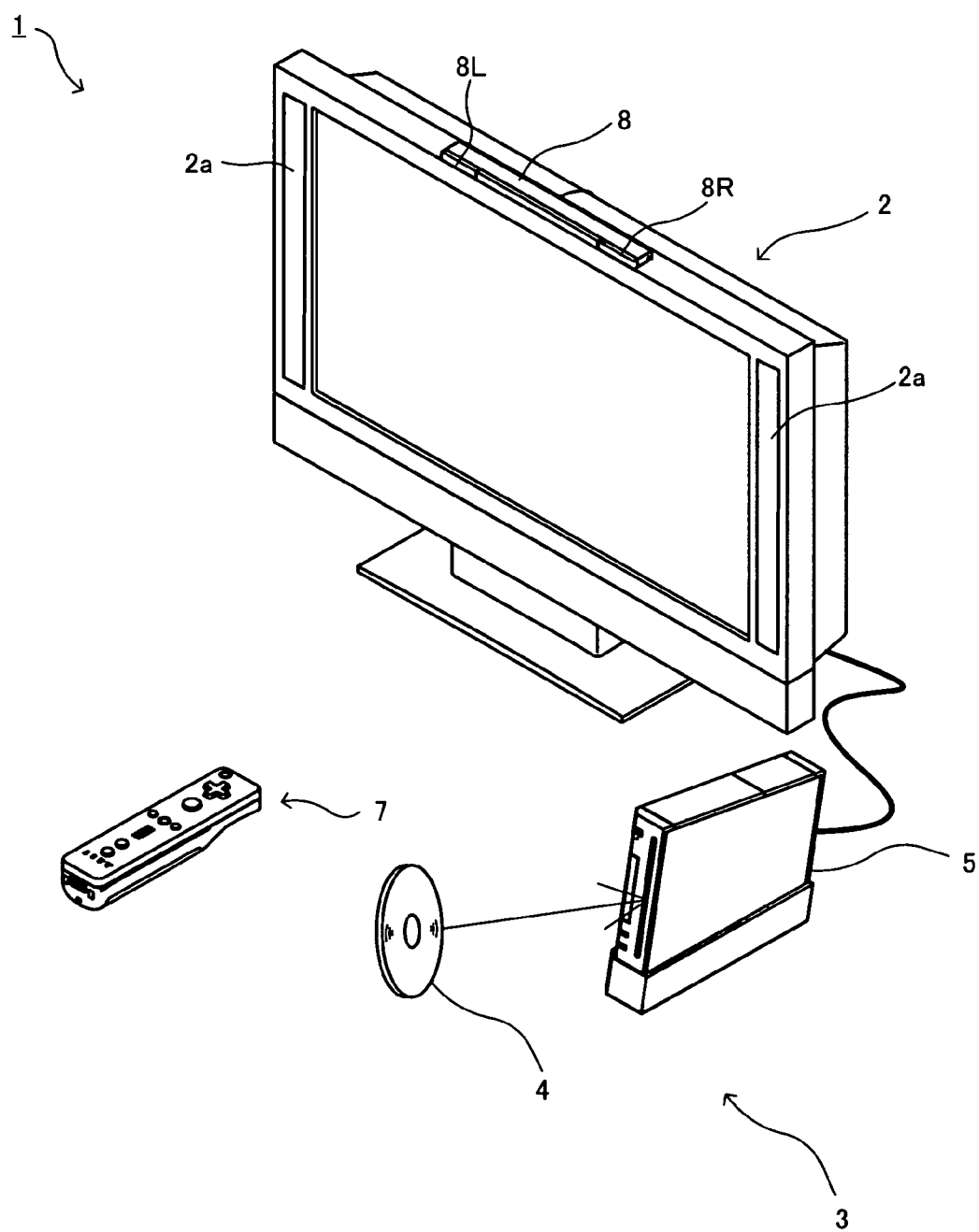
FIG. 1 is an external view of a game system 1 according to an embodiment of the present invention.
Figure 2:
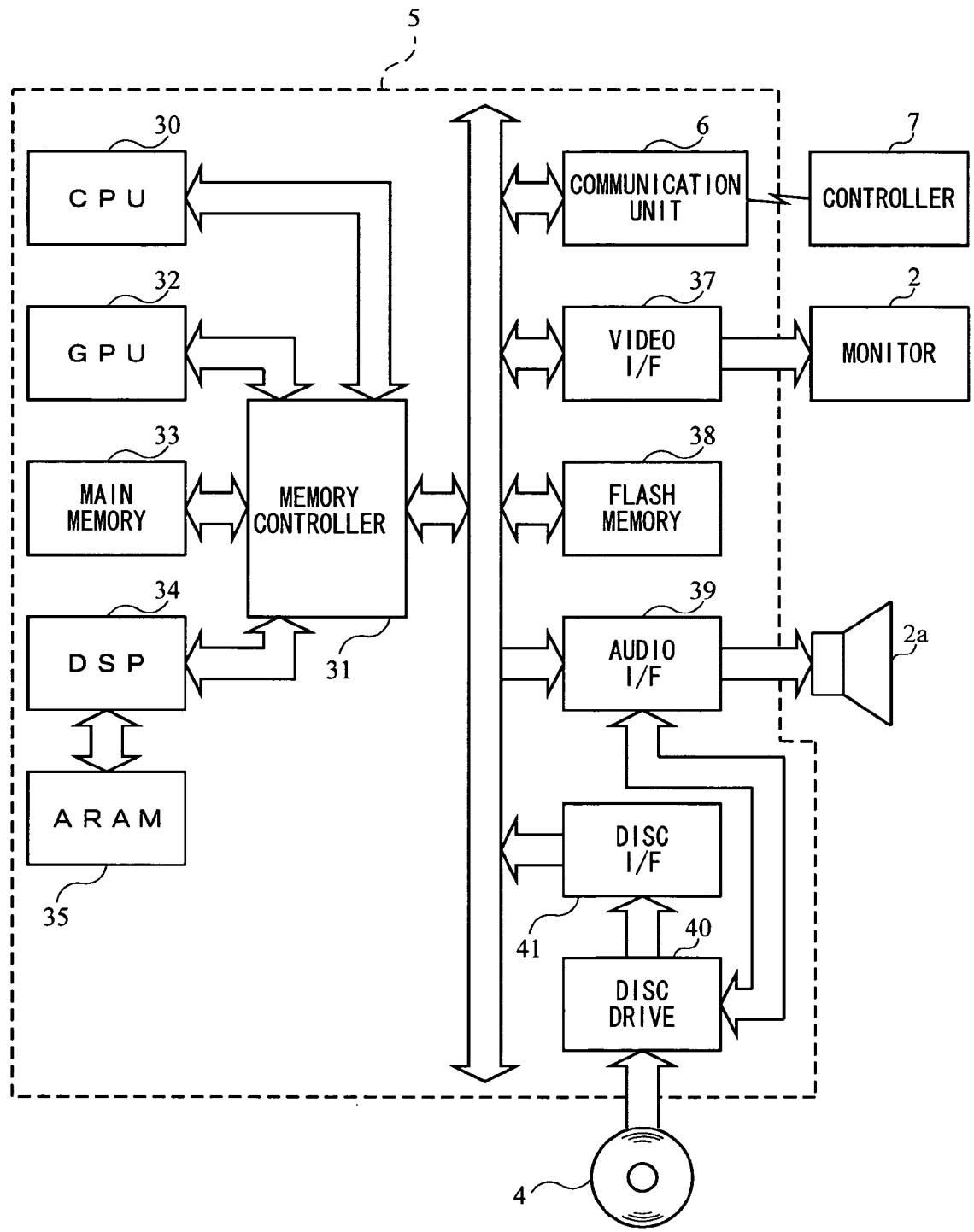
FIG. 2 is a block diagram of a game apparatus main body 5 shown in FIG. 1.

With reference to FIG. 1, a game apparatus according to one embodiment of the present invention will be described. In order to give a specific description, a game system 1 including an installation type game apparatus as an exemplary game apparatus according to the present invention will be described. FIG. 1 is an external view of the game system 1 including an installation type game apparatus 3. FIG. 2 is a block diagram of a game apparatus main body 5. Hereinafter, the game system 1 will be described.

As shown in FIG. 1, the game system 1 includes a home-use TV receiver (hereinafter, referred to as a "monitor") 2 as an example of display means and the installation type game apparatus 3 connected to the monitor 2 via a connection cord. The monitor 2 includes speakers 2a for outputting an audio signal which is output from the game apparatus main body 5. The game apparatus 3 includes an optical disc 4 having stored thereon a game program according to the present invention, the game apparatus main body 5 having a computer mounted thereon for executing the game program stored on the optical disc 4 and causing the monitor 2 to display a game screen, and a controller 7 for providing the game apparatus main body 5 with operation information required to play a game, for example, information required for operating characters displayed on the game screen.

The game apparatus main body 5 has a built-in communication unit 6 (FIG. 2). The communication unit 6 receives data which is wirelessly transmitted from the controller 7, and transmits data from the game apparatus main body 5 to the controller 7. The controller 7 and the game apparatus main body 5 communicate each other wirelessly. On the game apparatus main body 5, the optical disc 4 as an exemplary exchangeable information storage medium is detachably mounted. The game apparatus main body 5 has, on a front main surface thereof, a power ON/OFF switch, a game processing reset switch, an opening for mounting the optical disc 4, an eject switch for removing the optical disc 4 from the opening, and the like.

On the game apparatus main body 5, a flash memory 38 (FIG. 2) is mounted, which acts as a backup memory for fixedly storing saved data or the like. The game apparatus main body 5 executes a game program or the like stored on the optical disc 4 and displays the result on the monitor 2 as a game object. The game apparatus main body 5 can also reproduce a state of a game played in the past using saved data stored on the flash memory 38 and display a game image on the monitor 2. A player playing with the game apparatus main body 5 can enjoy the game by operating the controller 7 while watching the game image displayed on the monitor 2.

The controller 7 wirelessly transmits transmission data such as operation information or the like to the game apparatus main body 5 having the built-in communication unit 6, using the technology of Bluetooth (registered trademark) or the like. The controller 7 is operation means for mainly operating a player character or the like appearing in a game space displayed on a display screen of the monitor 2. The controller 7 includes a housing which is small enough to be held by one hand, and a plurality of operation buttons (including a cross key, a stick and the like) exposed on a surface of the housing. As described later in detail, the controller 7 also includes an imaging information calculation section 74 (FIG. 4) for taking an image viewed from the controller 7. As an example of an imaging target of the imaging information calculation section 74, two LED modules (hereinafter, referred to as "markers") 8L and 8R are provided in the vicinity of the display screen of the monitor 2. The markers 8L and 8R each output infrared light forward from the monitor 2. The controller 7 can generate a sound or vibration in accordance with the transmission data which is wirelessly transmitted from the communication unit 6 of the game apparatus main body 5 and received by a communication section 75 (FIG. 7) in the controller 7.

As shown in FIG. 2, the game apparatus main body 5 includes, for example, a CPU (central processing unit) 30 for executing various types of programs. The CPU 30 executes a start program stored on a boot ROM (not shown) to, for example, initialize memories including a main memory 33, and then executes a game program stored on the optical disc 4 to perform game processing or the like in accordance with the game program. The CPU 30 is connected to a GPU (Graphics Processing Unit) 32, the main memory 33, a DSP (Digital Signal Processor) 34, an ARAM (Audio RAM) 35 and the like via a memory controller 31. The memory controller 31 is connected to the communication unit 6, a video I/F (interface) 37, the flash memory 38, an audio I/F 39, and a disc I/F 41 via a predetermined bus. The video I/F 37, the audio I/F 39 and the disc I/F 41 are respectively connected to the monitor 2, the speaker 2a and a disc drive 40.

The GPU 32 performs image processing based on an instruction from the CPU 30. The GPU 32 includes, for example, a semiconductor chip for performing calculation processing necessary for displaying 3D graphics. The GPU 32 performs the image processing using a memory dedicated for image processing (not shown) or a part of the storage area of the main memory 33. The GPU 32 generates game image data and a movie to be displayed on the monitor 2 using such memories, and outputs the generated data or movie to the monitor 2 via the memory controller 31 and the video I/F 37 as necessary.

The main memory 33 is a storage area used by the CPU 30, and stores a game program or the like necessary for processing performed by the CPU 30 as necessary. For example, the main memory 33 stores a game program, various types of data or the like read from the optical disc 4 by the CPU 30. The game program, the various types of data or the like stored on the main memory 33 are executed by the CPU 30.

The DSP 34 processes sound data or the like generated by the CPU 30 during the execution of the game program. The DSP 34 is connected to the ARAM 35 for storing the sound data or the like. The ARAM 35 is used when the DSP 34 performs predetermined processing (e.g., storage of the game program or sound data already read). The DSP 34 reads the sound data stored on the ARAM 35 and outputs the sound data to the speaker 2a included in the monitor 2 via the memory controller 31 and the audio I/F 39.

The memory controller 31 comprehensively controls data transfer, and is connected to the various I/Fs described above. As described above, the communication unit 6 receives transmission data from the controller 7 and outputs the transmission data to the CPU 30. The communication unit 6 also transmits transmission data which is output from the CPU 30 to the communication section 75 of the controller 7. The video I/F 37 is connected to the monitor 2. The audio I/F 39 is connected to the speaker 2a built in the monitor 2, such that the sound data read by the DSP 34 from the ARAM 35 or sound data directly output from the disc drive 40 is output through the speaker 2a. The disc I/F 41 is connected to the disc drive 40. The disc drive 40 reads data stored at a predetermined reading position of the optical disc 4 and outputs the data to a bus of the game apparatus main body 5 or the audio I/F 39.

Figure 3:
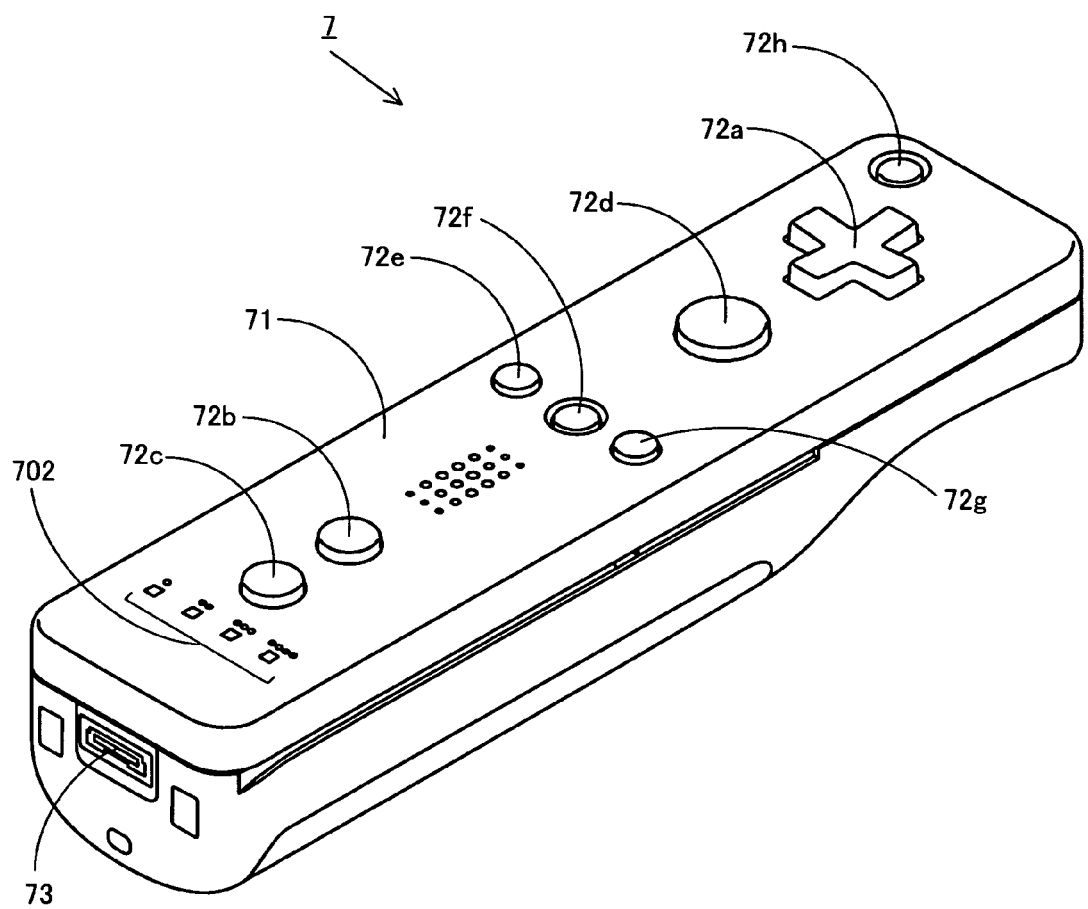
FIG. 3 is an isometric view of a controller 7 shown in FIG. 1, seen from the top rear side thereof.
Figure 4:
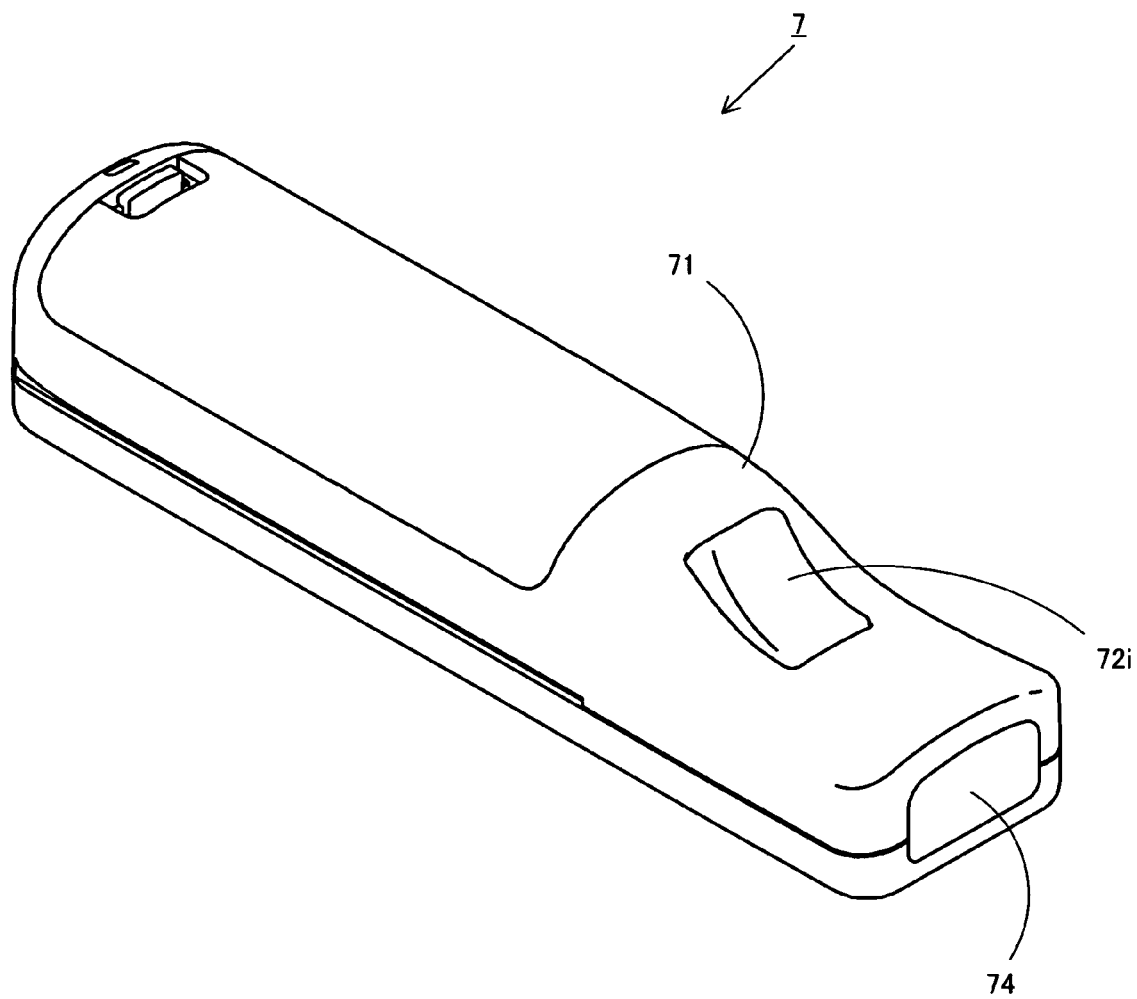
FIG. 4 is an isometric view of the controller 7 shown in FIG. 3, seen from the bottom front side thereof.

With reference to FIG. 3 and FIG. 4, the controller 7 will be described. FIG. 3 is an isometric view of the controller 7 seen from the top rear side thereof. FIG. 4 is an isometric view of the controller 7 seen from the bottom front side thereof.

As shown in FIG. 3 and FIG. 4, the controller 7 includes a housing 71 formed by plastic molding or the like. An operation section 72 including a plurality of operation buttons is provided in the housing 71. The housing 71 has a generally parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes projecting operation portions corresponding to the four directions (front, rear, right and left) and arranged at an interval of 90 degrees. The player selects one of the front, rear, right and left directions by pressing one of the operation portions of the cross key 72a. Through an operation on the cross key 72a, the player can, for example, instruct a direction in which a player character or the like appearing in a virtual game world is to move or select one of a plurality of alternatives.

The cross key 72a is an operation section for outputting an operation signal in accordance with the above-described direction input operation performed by the player, but such an operation section may be provided in another form. For example, the operation section may include four push switches provided in a cross arrangement, and output an operation signal in accordance with the push switch which has been pressed by the player. The operation section may further include a center switch provided at the intersection of the cross in addition to the four push switches. Alternatively, the cross key 72a may be replaced with an operation section which includes an inclinable stick (so-called joystick) projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad.

Rearward to the cross key 72a on the top surface of the housing 71, a plurality of operation buttons 72b through 72g are provided. The operation buttons 72b through 72g are each an operation section for outputting a respective operation signal when the player presses a head thereof. For example, the operation buttons 72b through 72d are assigned functions of a first button, a second button, and an A button. The operation buttons 72e through 72g are assigned functions of a minus button, a HOME button and a plus button, for example. The operation buttons 72b through 72g are assigned various functions in accordance with the game program executed by the game apparatus main body 5. In the exemplary arrangement shown in FIG. 3, the operation buttons 72b through 72d are arranged in a line extending in the front-rear direction at the center of the top surface of the housing 71. The operation buttons 72e through 72g are arranged in a line extending in the left-right direction between the operation buttons 72b and 72d. The operation button 72f has a top surface thereof buried in the top surface of the housing 71, so as not to be inadvertently pressed by the player.

Forward to the cross key 72a on the top surface of the housing 71, an operation button 72h is provided. The operation button 72h is a power switch for remote-controlling the power of the game apparatus main body 5 to be on or off. The operation button 72h also has a top surface thereof buried in the top surface of the housing 71, so as not to be inadvertently pressed by the player.

Rearward to the operation button 72c on the top surface of the housing 71, a plurality of LEDs 702 are provided. The controller 7 is assigned a controller type (number) so as to be distinguishable from the other controllers 7. For example, the LEDs 702 are used for informing the player of the controller type which is currently set to the controller 7 that he/she is using. Specifically, when the controller 7 transmits the transmission data to the communication unit 6, one of the plurality of LEDs corresponding to the controller type is lit up. The LEDs 702 can also show the remaining amount of a battery provided in the controller 7. Specifically, in accordance with the result of measurement of the battery voltage performed by an A-D (Analog to Digital) converter (described later) built in the controller 7, a number of LEDs 702 corresponding to the obtained battery voltage are lit up. For example, when the battery voltage is maximum, all the LEDs 702 are lit up; and as the battery voltage decreases, the number of the LEDs 702 lit up or the brightness of the LED(s) 702 is gradually reduced. When the battery voltage is minimum, all the LEDs 702 are extinguished.

On the top surface of the housing 71, sound holes for outputting a sound from a speaker (speaker 706 in FIG. 5) described later is provided between the operation button 72b and the operation buttons 72e through 72g.

On a bottom surface of the housing 71, a recessed portion is formed. The recessed portion is formed at a position at which an index finger or middle finger of the player is located when the player holds the controller 7 with one hand in the state where a front surface of the controller 7 is directed toward the markers 8L and 8R. On a slope surface of the recessed portion, an operation button 72i is provided. The operation button 72i is an operation section acting as, for example, a B button.

On the front surface of the housing 71, an imaging element 743 (see FIG. 7) included in the imaging information calculation section 74 is provided. The imaging information calculation section 74 is a system for analyzing image data which is taken by the controller 7, and detecting the position of the center of gravity, the size and the like of an area having a high brightness in the image data. The imaging information calculation section 74 has, for example, a maximum sampling period of about 200 frames/sec., and therefore can trace and analyze even a relatively fast motion of the controller 7. The structure of the imaging information calculation section 74 will be described later in detail. On a rear surface of the housing 71, a connector 73 (FIG. 5) is provided. The connector 73 is, for example, an edge connector, and is used for engaging and connecting the controller 7 with a connection cable.

Figure 5:
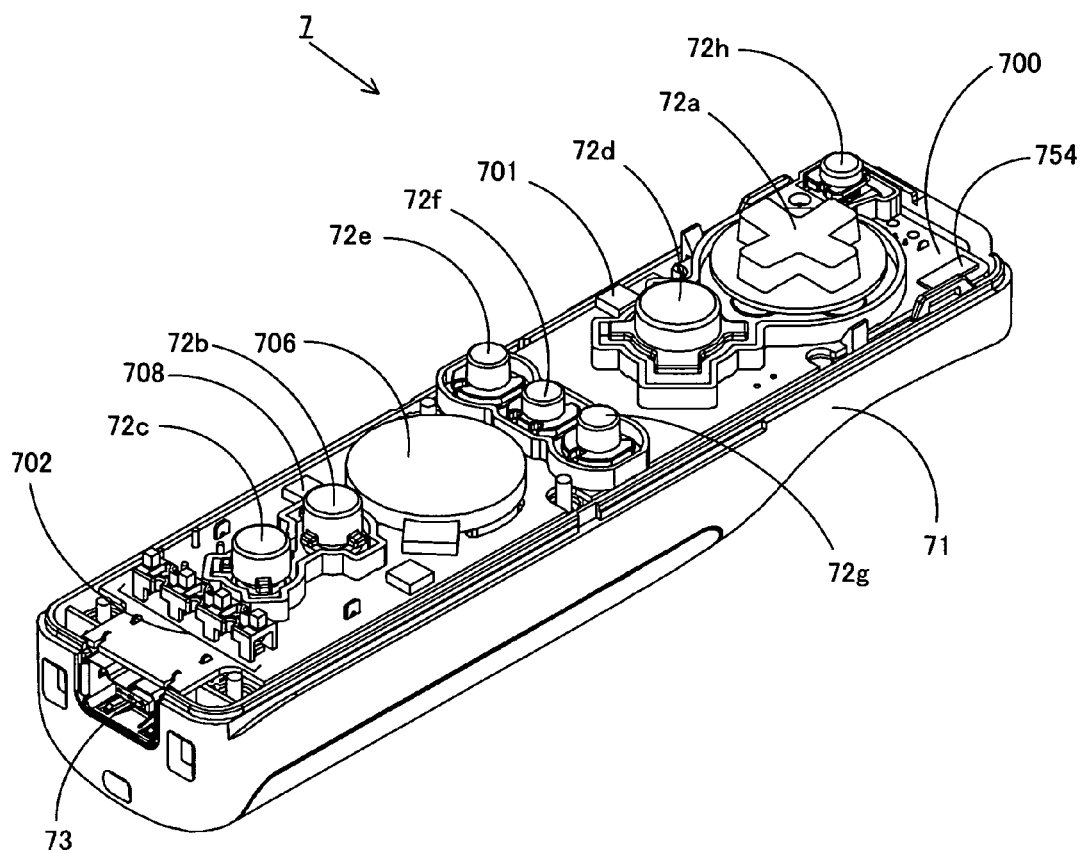
FIG. 5 is an isometric view of the controller 7 shown in FIG. 3, illustrating the state where an upper casing is removed.
Figure 6:
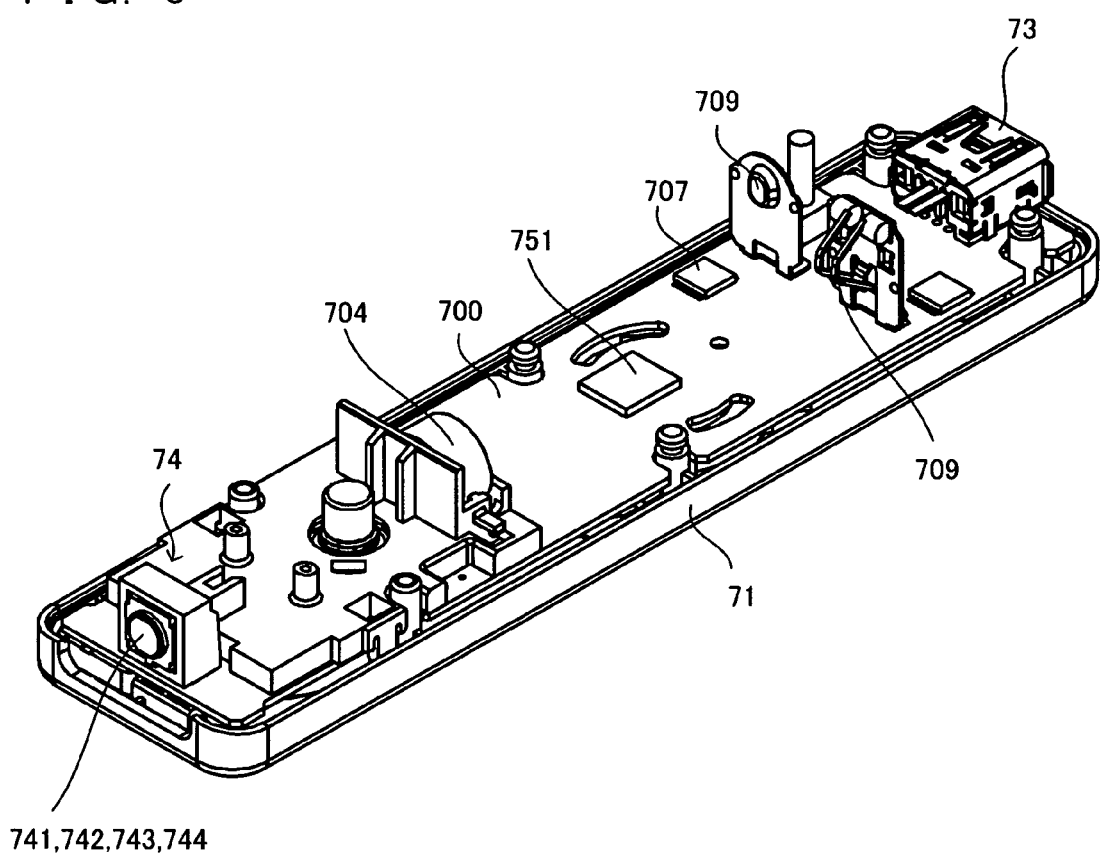
FIG. 6 is an isometric view of the controller 7 shown in FIG. 4, illustrating the state where a lower casing is removed.

With reference to FIG. 5 and FIG. 6, an internal structure of the controller 7 will be described. FIG. 5 is an isometric view of the controller 7 seen from the rear side, illustrating a state where an upper casing (a part of the housing 71) of the controller 7 is removed. FIG. 6 is an isometric view of the controller 7 seen from the front side, illustrating a state where a lower casing (a part of the housing 71) of the controller 7 and the built-in battery are removed. FIG. 6 shows a reverse side of a substrate 700 shown in FIG. 5.

As shown in FIG. 5, the substrate 700 is fixed inside the housing 71. On a top main surface of the substrate 700, the operation buttons 72a through 72h, an acceleration sensor 701, the LEDs 702, an antenna 754 and the like are provided. These elements are connected to a microcomputer 751 (see FIG. 6 and FIG. 7) or the like via lines (not shown) formed on the substrate 700 or the like. The controller 7 acts as a wireless controller owing to a wireless module 753 (see FIG. 7) and the antenna 754. The housing 71 accommodates a quartz vibrator for generating a reference clock of the microcomputer 751 described later in detail. On the top main surface of the substrate 700, the speaker 706 and an amplifier 708 are provided. The acceleration sensor 701 is provided on the substrate 700 to the left of the operation button 72d (i.e., in a peripheral area of the substrate 700, not in a central area). Owing to such an arrangement, as the controller 7 rotates around the longitudinal direction thereof, the acceleration sensor 701 detects an acceleration including a centrifugal force component in addition to a component of direction change of gravitational acceleration. As a result, the game apparatus main body 5 or the like can determine the rotation of the controller 7 at a high sensitivity based on the detected acceleration through a predetermined calculation.

As shown in FIG. 6, at a front edge of a bottom main surface of the substrate 700, the image information calculation section 74 is provided. The image information calculation section 74 includes an infrared filter 741, a lens 742, the imaging element 743 and an image processing circuit 744 located in this order from the front surface of the controller 7. These elements are attached to the bottom main surface of the substrate 700. At a rear edge of the bottom main surface of the substrate 700, the connector 73 is attached. In a central portion of the bottom main surface, terminals 709 are provided for attaching batteries. On the bottom main surface of the substrate 700, a sound IC 707 and the microcomputer 751 are provided. The sound IC 707 is connected to the microcomputer 751 and the amplifier 708 via lines provided on the substrate 700 or the like, and outputs a sound signal to the speaker 706 via the amplifier 708 in accordance with the sound data transmitted from the game apparatus main body 5.

On the bottom main surface of the substrate 700, a vibrator 704 is attached. The vibrator 704 is, for example, a vibration motor or a solenoid. The vibrator 704 is connected to the microcomputer 751 via lines provided on the substrate 700 or the like, and turns the microcomputer 751 on or off in accordance with vibration data transmitted from the game apparatus main body 5. The controller 7 is vibrated by an actuation of the vibrator 704, and the vibration is conveyed to the player holding the controller 7. Thus, a so-called vibration-responsive game is realized. Since the vibrator 704 is provided slightly forward with respect to the center of the housing 71, the housing 71 held by the player is largely vibrated. Thus, the player easily senses the vibration.

With respect to FIG. 7, the internal structure of the controller 7 will be described. FIG. 7 is a block diagram showing the structure of the controller 7.

As shown in FIG. 7, the controller 7 includes a communication section 75 therein in addition to the operation section 72, the imaging information calculation section 74, the acceleration sensor 701, the vibrator 704, the speaker 706, the sound IC 707 and the amplifier 708 described above.

The imaging information calculation section 74 includes the infrared filter 741, the lens 742, the imaging element 743 and the image processing circuit 744. The infrared filter 741 allows only infrared light to pass therethrough, among light incident on the front surface of the controller 7. The lens 742 collects the infrared light which has passed through the infrared filter 741 and outputs the infrared light to the imaging element 743. The imaging element 743 is a solid-state imaging device such as, for example, a CMOS sensor or a CCD. The imaging element 743 takes an image of the infrared light collected by the lens 742. Accordingly, the imaging element 743 takes an image of only the infrared light which has passed through the infrared filter 741 for generating image data. The image data generated by the imaging element 743 is processed by the image processing circuit 744. Specifically, the image processing circuit 744 processes the image data obtained from the imaging element 743, senses an area thereof having a high brightness, and outputs the processing result data representing the detected positional coordinate set and size of the area to the communication section 75. The imaging information calculation section 74 is fixed to the housing 71 of the controller 7. The imaging direction of the imaging information calculation section 74 can be changed by changing the direction of the housing 71.

The acceleration sensor 701 included in the controller 7 is preferably a three-axial (X, Y and Z axes) acceleration sensor. The three-axial acceleration sensor 701 detects a linear acceleration in each of three directions, i.e., an up-down direction (Y-axis direction), a left-right direction (X-axis direction), and a front-rear direction (Z-axis direction). For example, such an acceleration sensor 701 may be available from Analog Devices, Inc. or STMicroelectronics N.V. The acceleration sensor 701 is preferably of a static capacitance system (static capacitance coupling system) based on the technology of MEMS (Micro Electro Mechanical Systems) provided by silicon precision processing. Alternatively, the acceleration sensor 701 may be based on an existing acceleration detection technology (e.g., piezoelectric system or piezoelectric resistance system) or any other appropriate technology developed in the future.

The acceleration detection means used for the acceleration sensor 701 can detect only an acceleration along a straight line corresponding to each of the axes of the acceleration sensor 701 (linear acceleration). Namely, a direct output from the acceleration sensor 701 is a signal indicating the linear acceleration (static or dynamic) along each of the three axes thereof. Hence, the acceleration sensor 701 cannot directly detect a physical property such as, for example, a motion along a nonlinear path (e.g., an arc path), rotation, revolution, angular displacement, inclination, position or posture.

Nonetheless, those skilled in the art would easily understand from the description of this specification that further information on the controller 7 can be estimated or calculated (determined) by executing additional processing on an acceleration signal which is output from the acceleration sensor 701. For example, when a static acceleration (gravitational acceleration) is detected, an inclination of the target (controller 7) with respect to the gravitational vector can be determined by performing calculations based on the inclination angle and the detected acceleration, using the output from the acceleration sensor 701. By combining the acceleration sensor 701 with the microcomputer 751 (or another processor included in the game apparatus main body 5, such as the CPU 30 or the like) in this manner, the inclination, posture or position of the controller 7 can be determined. Similarly, when the controller 7 including the acceleration sensor 701 is dynamically accelerated by a hand of the player, various motions and/or positions of the controller 7 can be calculated by processing an acceleration signal generated by the acceleration sensor 701. In another embodiment, the acceleration sensor 701 may include a built-in signal processing device, or another type of dedicated processing device, for executing desired processing on an acceleration signal which is output from the built-in acceleration detection means, before the signal is output to the microcomputer 751. For example, when the acceleration sensor 701 is for detecting a static acceleration (e.g., a gravitational acceleration), the built-in or dedicated processing device may convert the detected acceleration signal to a corresponding inclination angle (or another preferable parameter). The data indicating the acceleration detected by the acceleration sensor 701 is output to the communication section 75.

The communication section 75 includes the microcomputer 751, a memory 752, the wireless module 753, and the antenna 754. The microcomputer 751 controls the wireless module 753 for wirelessly transmitting the transmission data, while using the memory 752 as a storage area during processing. The microcomputer 751 includes the A-D converter for converting an analog signal which is output from each of the operation section 72, the acceleration sensor 701, and the imaging information calculation section 74 into a digital signal and generating transmission data. In this embodiment, the voltage of the batteries attached to the controller 7 is measured using the A-D converter included in the microcomputer 751. The battery voltage is measured when necessary, and digital data representing the battery voltage is also transmitted as transmission data. The microcomputer 751 also controls the operation of the sound IC 707 and the vibrator 704 in accordance with the data transmitted from the game apparatus main body 5 to the wireless module 753 via the antenna 754. The sound IC 707 processes sound data or the like transmitted from the game apparatus main body 5 via the communication section 75. The microcomputer 751 actuates the vibrator 704 in accordance with, for example, the vibration data (e.g., a signal for turning the vibrator 704 on or off) transmitted from the game apparatus main body 5 via the communication section 75.

Data from the controller 7 including an operation signal (key data) from the operation section 72, acceleration signals in the three axial directions (X-axis, Y-axis and Z-axis direction acceleration data) from the acceleration sensor 701, and the processing result data from the imaging information calculation section 74 are output to the microcomputer 751. The microcomputer 751 temporarily stores the input data (the key data; the X-axis, Y-axis and Z-axis direction acceleration data; and the processing result data) on the memory 752 as transmission data which is to be transmitted to the communication unit 6. The wireless transmission from the communication section 75 to the communication unit 6 is performed at a predetermined time interval. Since game processing is generally performed at a cycle of ⅟60 sec., the wireless transmission needs to be performed at a cycle of a shorter time period. Specifically, the game processing unit is 16.7 ms (⅟60 sec.), and the transmission interval of the communication section 75 structured using the Bluetooth (registered trademark) technology is, for example, 5 ms. At the transmission timing to the communication unit 6, the microcomputer 751 outputs the transmission data stored on the memory 752 as a series of operation information to the wireless module 753. Using the Bluetooth (registered trademark) technology or the like, the wireless module 753 uses a carrier wave of a predetermined frequency to radiate, from the antenna 754, the operation information in the form of a carrier wave signal of a predetermined frequency. Namely, the key data from the operation section 72, the X-axis, Y-axis and Z-axis direction acceleration data from the acceleration sensor 701, and the processing result data from the imaging information calculation section 74 a retransmitted from the controller 7. The communication unit 6 of the game apparatus main body 5 receives the carrier wave signal, and the game apparatus main body 5 demodulates or decodes the carrier wave signal to obtain the series of operation information (the key data; the X-axis, Y-axis and Z-axis direction acceleration data; and the processing result data) Based on the obtained operation information and the game program, the CPU 30 of the game apparatus main body 5 performs the game processing. In the case where the communication section 75 is structured using the Bluetooth (registered trademark) technology, the communication section 75 can have a function of receiving transmission data which is wirelessly transmitted from other devices.

The microcomputer 751 temporarily stores battery voltage data representing the battery voltage of the controller 7 on the memory 752 as transmission data in accordance with a request from the game apparatus main body 5. Like the operation information described above, at the transmission timing to the communication unit 6, the microcomputer 751 outputs the battery voltage data stored on the memory 752 from the antenna 754 to the game apparatus main body 5 via the wireless communication module 753.

As described later in detail, a game program according to the present invention is executable as long as at least the key data and the battery voltage data are transmitted among the data transmitted as the transmission data (the key data; the X-axis, Y-axis and Z-axis direction acceleration data; and the processing result data). In this case, the controller 7 does not need to include the acceleration sensor 701 or the imaging information calculation section 74. The controller 7 does not need to include the elements for outputting an audio signal from the controller 7 (the speaker 706, the amplifier 708 and the sound IC 707) or the element for vibrating the controller 7 (the vibrator 704).

Figure 10:
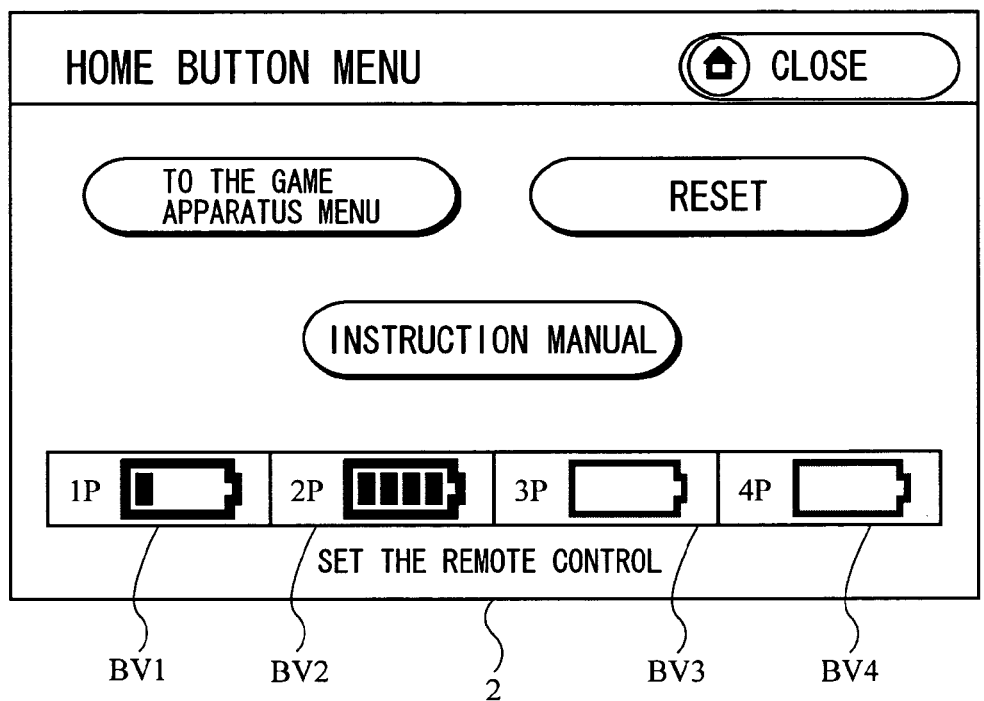
FIG. 10 shows an exemplary remaining battery amount checking image which is displayed on the display screen of the monitor 2 when the player presses a HOME button.

Before describing specific processing executed by the game apparatus main body 5, an overview of remaining battery amount checking processing executed by the game apparatus main body 5 will be described with reference to FIG. 8 through FIG. 10. FIG. 8 shows an exemplary image displayed on the display screen of the monitor 2 when the wireless communication is disconnected. FIG. 9 shows an exemplary image displayed on the display screen of the monitor 2 when the wireless communication is disconnected due to the insufficient amount of the battery. FIG. 10 shows an exemplary remaining battery amount checking image displayed on the display screen of the monitor 2 when the player presses the HOME button (the operation button 72*f*).

Referring to FIG. 8, when the wireless communication between the controller 7 and the game apparatus main body 5 is disconnected, a notice to urge the player to recover the wireless communication is displayed on the monitor 2. In the example shown in FIG. 8, the game which is being played is automatically interrupted and the notice "The remote control needs re-connection. Press the A button." is displayed in order to urge the player to recover the wireless communication. The wireless communication between the controller 7 and the game apparatus main body 5 may be disconnected, for example, when the remaining amount of the battery in the controller 7 is insufficient, when the controller 7 is moved to a position where the wireless communication is impossible, or the wireless communication is disrupted by noise caused by the other communication or the like, or by an obstacle or the like located between the game apparatus main body 5 and the controller 7.

Referring to FIG. 9, when the wireless communication between the controller 7 and the game apparatus main body 5 is disconnected due to the insufficient battery voltage of the controller 7, a notice to inform the player that the battery is running down and to urge the player to check the remaining battery amount is displayed on the monitor 2. In the example shown in FIG. 9, the game which is being played is automatically interrupted and the notice "The battery is running down. Re-connect the remote control with the A button and check the remaining battery amount with the HOME button menu screen." is displayed on the monitor 2 to inform the player that the battery is running down and to urge the player to check the remaining battery amount.

As described later in detail, the image to urge the player to recover the wireless communication (FIG. 8) and the image to urge the player to check the remaining battery amount (FIG. 9) are displayed on the monitor 2, with the game being interrupted. Therefore, the game image provided by the game processing may be paused and kept displayed as the background of the image of these letters. In this case, the letters of the notice indicating that the power of the controller 7 is insufficient is superimposed on the game image which is at a pause on the monitor 2.

Referring to FIG. 10, when the player presses the HOME button (the operation button 72*f*), a HOME button menu is displayed. The HOME button menu shows the remaining battery amount of each controller 7 which is currently wirelessly communicated with the game apparatus main body 5. In the example shown in FIG. 10, two controllers 7 (player 1 (1P) and player 2 (2P)) are currently wirelessly communicated with the game apparatus main body 5. The remaining amount of the battery attached to the controller 7 of 1P is indicated with a remaining battery amount image BV1. The remaining amount of the battery attached to the controller 7 of 2P is indicated with a remaining battery amount image BV2. The remaining battery amount image BV2 indicates that the remaining battery amount of the controller 7 of 2P is at the highest stage of five-stage evaluation (for example, the battery voltage is 2.60 V or higher) and the battery is not running down. By contrast, the remaining battery amount image BV1 indicates that the remaining battery amount of the controller 7 of 1P is at the second stage from the bottom of five-stage evaluation (for example, the battery voltage is 2.12 V or higher but less than 2.40 V) and the battery needs to be replaced (recharged).

Figure 11:
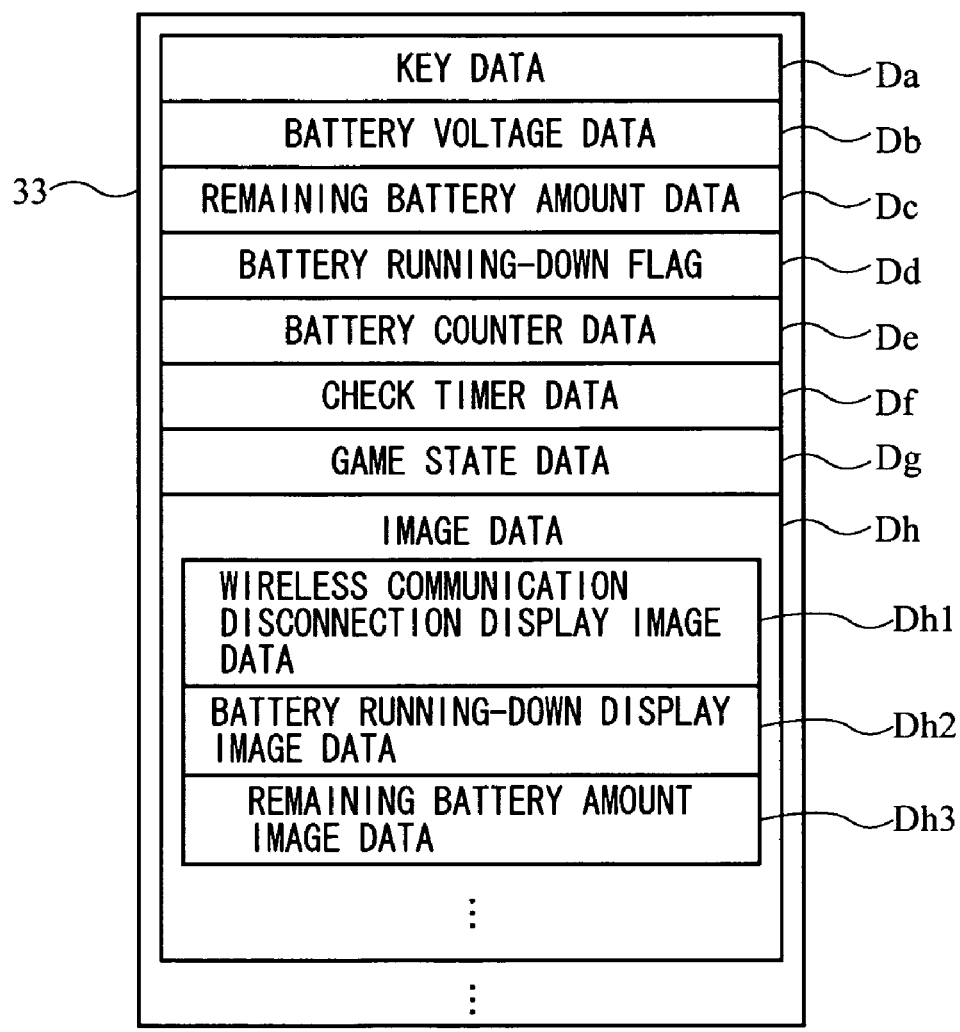
FIG. 11 shows main data stored on a main memory 33 of the game apparatus main body 5.

Next, the remaining battery amount checking processing executed by the game system 1 will be described in detail. First, with reference to FIG. 11, main data used for the remaining battery amount checking processing will be described. FIG. 11 shows main data stored on the main memory 33 of the game apparatus main body 5.

As shown in FIG. 11, the main memory 33 stores key data Da, battery voltage data Db, remaining battery amount data Dc, a battery running-down flag Dd, battery counter data De, check timer data Df, game state data Dg, image data Dh and the like. In addition to the data shown in FIG. 11, the main memory 33 also stores data regarding a player character, other objects and the like used for the game processing, data regarding a virtual game space, and other data required for the processing.

The key data Da is included in the series of operation information which is transmitted from the controller 7 as transmission data. The communication unit 6 built in the game apparatus main body 5 receives the operation information which is transmitted from the controller 7 at a predetermined interval (for example, every 5 ms), and stores the operation information on a buffer (not shown) included in the communication unit 6. Then, the operation information is read at every frame (1/60 sec.), which is the game processing interval, and thus the key data Da in the main memory 33 is updated. The series of operation information transmitted from the controller 7 as transmission data includes processing result data and acceleration data in addition to the key data. With the flowcharts illustrated later, an embodiment which does not use the processing result data or acceleration data will be described.

The battery voltage data Db is transmitted from the controller 7 as transmission data. As described above, the microcomputer 751 in the controller 7 transmits the battery voltage data representing the battery voltage of the controller 7 as transmission data in accordance with a request from the game apparatus main body 5. The battery voltage data Db is managed for each controller 7, and is updated with the newly received battery voltage data. For example, the battery voltage data transmitted from the controller 7 indicates the value of the battery voltage in the range of 2.1 V to 3.6 V, and is represented with a value in a 256-scale range in which the battery voltage of 2.1 V is 0 and the battery voltage of 3.6 V is 255.

The remaining battery amount data Dc represents the remaining battery amount evaluated with a plurality of stages (for example, five stages) based on the received battery voltage data of each controller 7. For example, the remaining battery amount data Dc is represented with one of five stages of the highest level (MAX; 2.60 V or higher), the high level (HIGH; 2.50 V or higher), the medium level (MEDIUM; 2.40 V or higher), the low level (LOW; 2.12 V or higher) and the critical level (CRITICAL; less than 2.12 V).

The battery running-down flag Dd represents a battery running-down flag FLB which indicates whether or not the remaining battery amount of each controller 7 is at such a level that requires replacement or recharging. For example, the battery running-down flag FLB is set to ON when the remaining battery amount of the controller 7 is at the low level or the critical level. The battery running-down flag FLB is set to OFF when the remaining battery amount of the controller 7 is at the highest level, the high level or the medium level.

The battery counter data De represents a count value of a battery counter BC which is updated in each processing loop described later. The battery counter data De is used for determining whether or not the wireless communication has been disconnected a plurality of times due to the insufficient remaining amount of the battery in the controller 7. The check timer data Df represents a count value of a check timer CT which is updated in each processing loop described later. The check timer data Df is used for controlling the cycle at which the battery voltage data is re-requested of the controller 7.

The game state data Dg represents the game state at the time when the game is interrupted. The image data Dh includes wireless communication disconnection display image data Dh1, battery running-down display image data Dh2, remaining battery amount image data Dh3 and the like. The wireless communication disconnection display image data Dh1 is used for generating a notice image (FIG. 8) which, when the wireless communication between the controller 7 and the game apparatus main body 5 is disconnected, urges the player to recover the wireless communication. The battery running-down display image data Dh2 is used for generating a notice image (FIG. 9) which, when the wireless communication between the controller 7 and the game apparatus main body 5 is disconnected due to the insufficient voltage of the battery, informs the player that the battery is running down and urges the player to check the remaining battery amount. The remaining battery amount image data Dh3 is used for generating the remaining battery amount checking images BV1 through BV4 (FIG. 10) displayed in the HOME button menu.

Figure 12:
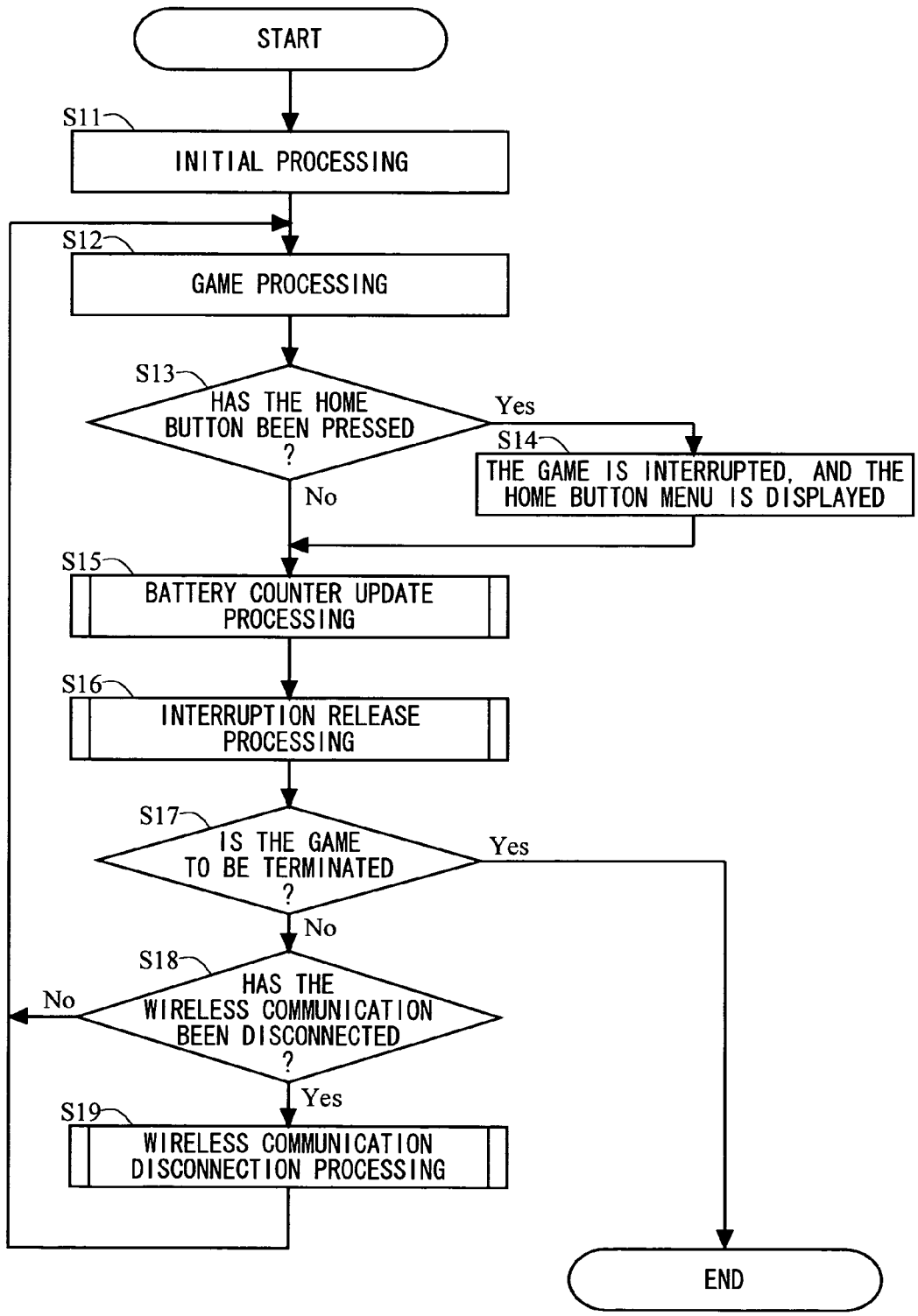
FIG. 12 is a flowchart illustrating a flow of remaining battery amount checking processing executed by the game apparatus main body 5.
Figure 13:
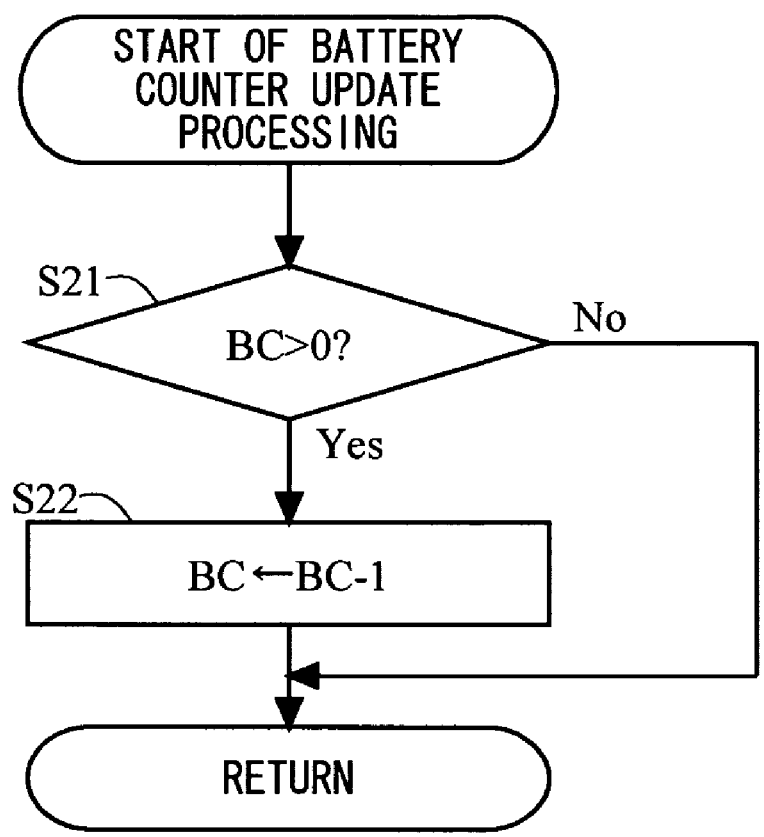
FIG. 13 is a flow chart of a subroutine of battery counter update processing in step 15 in FIG. 12 in detail.
Figure 14:
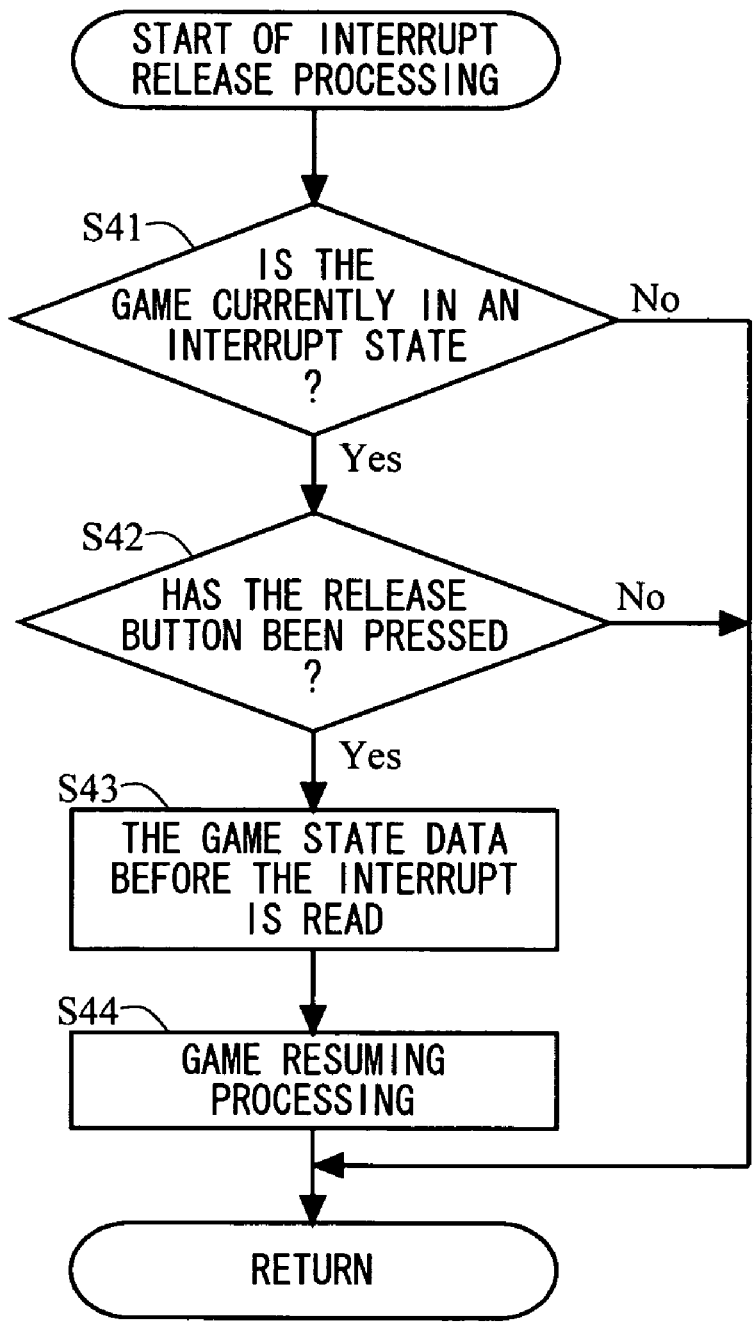
FIG. 14 is a flowchart of a subroutine of interrupt release processing in step 16 in FIG. 12 in detail.
Figure 15:
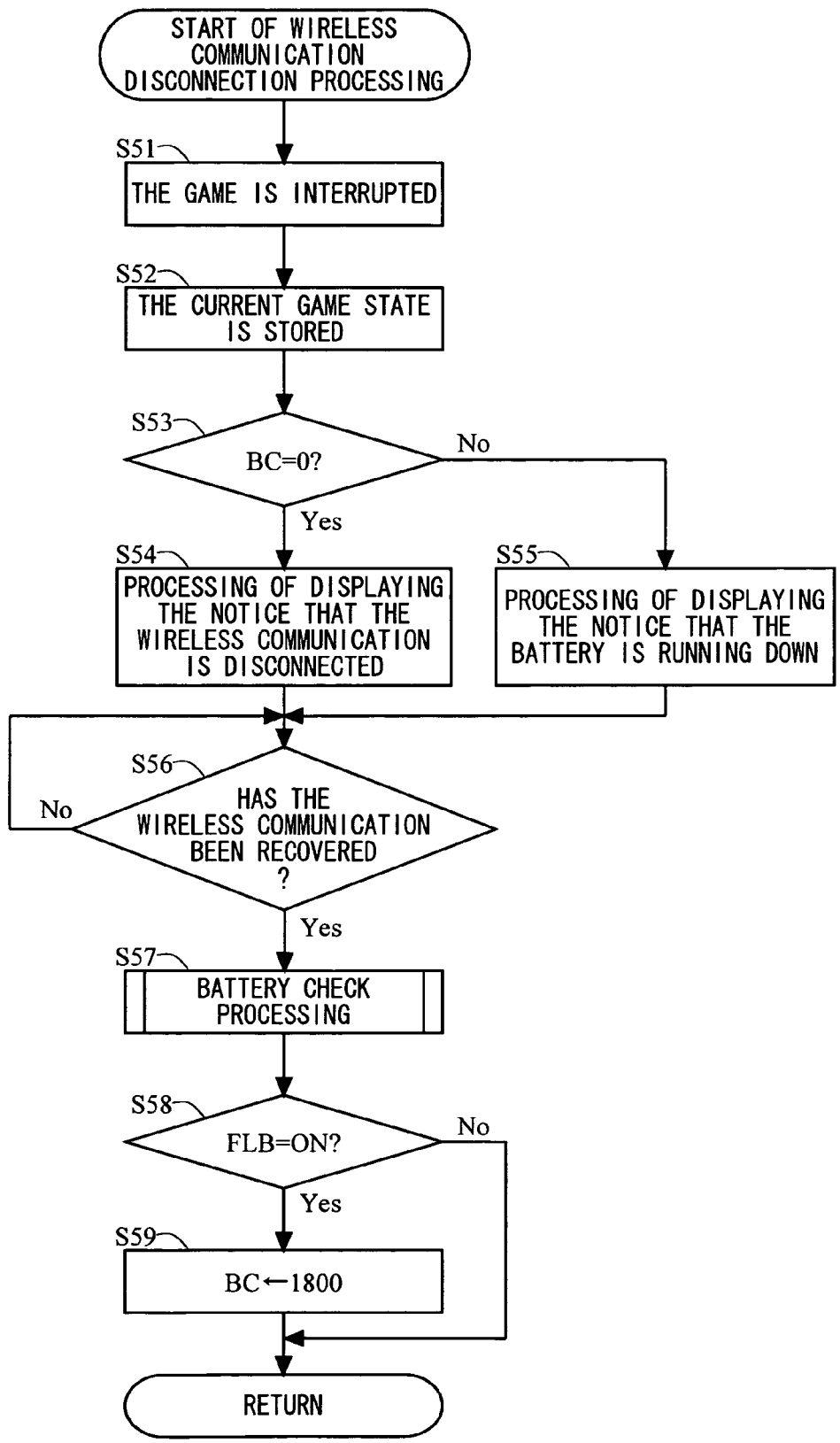
FIG. 15 is a flowchart of a subroutine of wireless communication disconnection processing in step 19 in FIG. 12 in detail.
Figure 16:
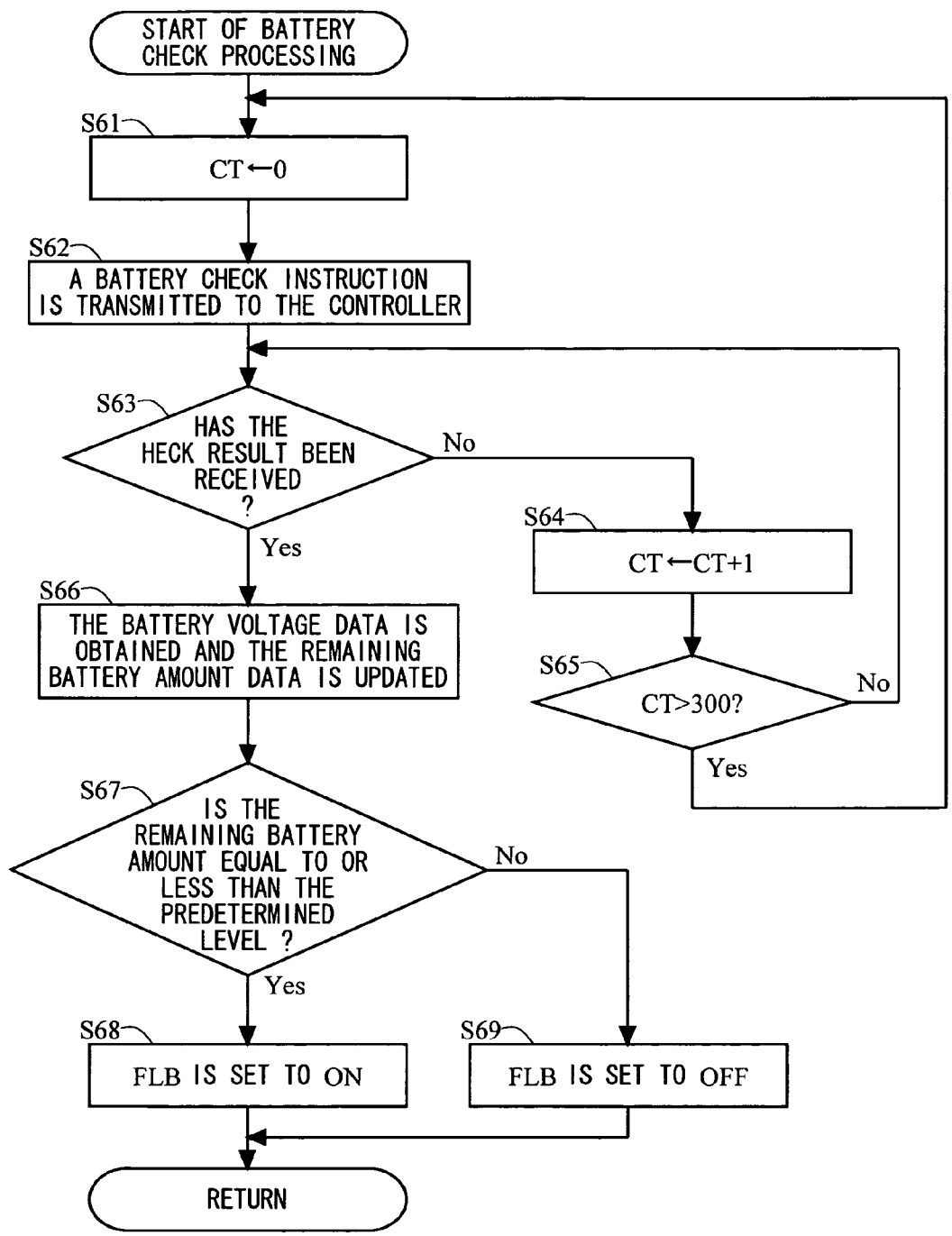
FIG. 16 is a flowchart of a subroutine of battery check processing in step 57 in FIG. 16 in detail.

Next, with reference to FIG. 12 through FIG. 16, the remaining battery amount checking processing executed by the game apparatus main body 5 will be described. FIG. 12 is a flowchart illustrating a flow of the remaining battery amount checking processing executed by the game apparatus main body 5. FIG. 13 is a flowchart showing a subroutine of battery counter update processing in step 15 shown in FIG. 12 in detail. FIG. 14 is a flowchart showing a subroutine of interrupt release processing in step 16 shown in FIG. 12 in detail. FIG. 15 is a flowchart showing a subroutine of wireless communication disconnection processing in step 19 shown in FIG. 12 in detail. FIG. 16 is a flowchart showing a subroutine of battery check processing in step 57 shown in FIG. 15 in detail. With reference to the flowcharts in FIG. 12 through FIG. 16, the remaining battery amount checking processing will be mainly described, and other types of game processing which is not directly relevant to the present invention will not be described. In FIG. 12 through FIG. 16, the steps executed by the CPU 30 will be represented with "S". The processing shown in FIG. 12 through FIG. 16 is executed for each of a plurality of controllers 7 wirelessly connected to the game apparatus main body 5. In the following example, it is assumed that one controller 7 is wirelessly connected to the game apparatus main body 5.

When the power of the game apparatus main body 5 is turned on, the CPU 30 of the game apparatus main body 5 executes a start program stored on a boot ROM (not shown) to initialize the elements including the main memory 33. The game program stored on the optical disc 4 is read into the main memory 33, and the CPU 30 starts execution of the game program. The remaining battery amount checking processing shown in FIG. 12 through FIG. 16 is executed after the above-described processing is completed.

Referring to FIG. 12, the CPU 30 executes initial processing of the remaining battery amount checking processing (step 11), and advances the processing to the next step. For example, the CPU 30 sets the count value of the battery counter BC to 0 to update the battery counter data De. The CPU 30 also establishes the wireless connection with the controller 7 and obtains information on the controller 7 (controller ID, battery voltage data, etc.) from the controller 7. The CPU 30 uses the obtained battery voltage data to calculate the remaining battery amount, and stores the battery voltage data and the remaining battery amount in the battery voltage data Db and the remaining battery amount data Dc, respectively. For example, the CPU 30 classifies the value in the 256-scale range represented by the obtained battery voltage data into one of the five stages to set a remaining battery amount level, and stores the remaining battery amount level as the remaining battery amount data Dc.

Next, the CPU 30 obtains a series of operation information and executes game processing (step 12) and advances the processing to the next step. For example, the CPU 30 obtains a series of operation information transmitted from the controller 7 and stores the operation information on the main memory 33. The CPU 30 causes the player character appearing in the virtual game space to make a motion in accordance with the key data Da or the like obtained from the controller 7 and updated, and displays the virtual game space on the monitor 2. In step 12, various types of processing is executed in accordance with the game played by the player. This will not be described in detail.

Next, the CPU 30 determines whether or not the player has pressed the HOME button of the controller 7 (step 13). This determination is made by, for example, referring to the key data Da to check whether or not the key data indicating that the player has pressed the HOME button of the controller 7 has been received. When the HOME button has been pressed, the CPU 30 advances the processing to step 14. By contrast, when the HOME button has not been pressed, the CPU 30 advances the processing to step 15.

In step 14, the CPU 30 interrupts the game which is being played and displays the HOME button menu (FIG. 10) on the monitor 2, and advances the processing to step 15. For example, when interrupting the game, the CPU 30 stores the state of the game in the game state data Dg. When displaying the HOME button menu on the monitor 2, the CPU 30 displays the remaining battery amount checking images BV1 through BV4 each representing the remaining battery amount of the controller 7. The remaining battery amount represented by each of the remaining battery amount checking images BV1 through BV4 is obtained by referring to the remaining battery amount data Dc regarding each controller 7 (for example, the level data representing the stage among the plurality of stages). Regarding the controllers 7 which are not connected to the game apparatus main body 5, the remaining battery amount is represented with blank (namely, for example, with a thin gray battery mark as in the remaining battery amount checking image BV3 and BV4 in FIG. 10). The player can check, on the monitor 2, the remaining battery amount of the controller 7 that he/she is using and also the remaining battery amounts of the controllers 7 that the other players are using, by pressing the HOME button.

In step 15, the CPU 30 executes battery counter update processing, and advances the processing to the next step. Hereinafter, with reference to FIG. 13, the battery counter update processing will be described in detail.

Referring to FIG. 13, the CPU 30 refers to the count value of the battery counter BC stored in the battery counter data De to determine whether or not the count value of the battery counter BC is greater than 0 (step 21). When the count value of the battery counter BC is greater than 0, the CPU 30 advances the processing to step 22. By contrast, when the count value of the battery counter BC is 0, the CPU 30 terminates the battery counter update processing.

In step 22, the CPU 30 subtracts 1 from the count value of the battery counter BC stored in the battery counter data De to update the battery counter data De. Then, the CPU 30 terminates the battery counter update processing.

Returning to FIG. 12, after the battery counter update processing in step 15, the CPU 30 execute the interrupt release processing and advances the processing to the next step. Hereinafter, with reference to FIG. 14, the interrupt release processing will be described in detail.

Referring to FIG. 14, the CPU 30 determines whether or not the game is currently in an interrupt state (step 41). When the game is currently in an interrupt state, the CPU 30 advances the processing to step 42. By contrast, when the game is currently not in an interrupt state, the CPU 30 terminates the interrupt release processing.

In step 42, the CPU 30 determines whether or not the player has pressed a release button for releasing the interrupt state. This determination is made by, for example, referring to the key data Da to determine whether or not key data indicating that the player has pressed the release button (any one of the operation buttons in the operation section 72; may be varied in accordance with the mode of interruption) has been received. When the release button has been pressed, the CPU 30 advances the processing to step 43. By contrast, when the release button has not been pressed, the CPU 30 terminates the interrupt release processing.

In step 43, the CPU 30 reads data stored in the game state data Dg. The CPU 30 executes game resuming processing based on the game state data which has been read (step 44), and then terminates the interrupt release processing. The game resuming processing is executed by, for example, reproducing the game processing state before the interrupt based on the game state data which was read in step 43 and displaying the game state before the interrupt on the monitor 2.

Returning to FIG. 12, after the interrupt release processing in step 16, the CPU 30 determines whether or not to terminate the game (step 17). The game is to be terminated when, for example, the condition for terminating the game has been fulfilled or the player has performed an operation to terminate the game. When the game is not to be terminated, the CPU 30 advances the processing to step 18. By contrast, when the game is to be terminated, the CPU 30 terminates the remaining battery amount checking processing shown in FIG. 12.

In step 18, the CPU 30 detects whether or not the wireless communication between the game apparatus main body 5 and the controller 7 has been disconnected. When the wireless communication has been disconnected, the CPU 30 advances the processing to step 19. By contrast, when the wireless communication has not been disconnected, the CPU 30 returns the processing to step 12 and the above-described processing is repeated.

For checking whether or not the wireless communication between the game apparatus main body 5 and the controller 7 has been disconnected, various methods are usable. According to a first exemplary method, the controller 7 monitors the wireless communication state with the game apparatus main body 5. When the wireless communication is temporarily disconnected, a disconnection command is transmitted from the controller 7 to the game apparatus main body 5. When receiving such an explicit disconnection command from the controller 7, the CPU 30 detects that the wireless communication has been temporarily disconnected. According to a second exemplary method, the game apparatus main body 5 transmits a disconnection command to the controller 7 to check if the wireless communication is being normally performed or not. In accordance with whether or not the response from the controller 7 is positive (for example, ACK; ACKnowledgement), the CPU 30 detects whether or not wireless communication has been disconnected. According to a third exemplary method, when the game apparatus main body 5 cannot receive a signal from a specific controller 7 for a predetermined time period (for example, 2 seconds), the CPU 30 determines that the wireless communication with such a controller 7 has been disconnected. Such a state is detected by the CPU 30 monitoring the signal receiving state from the controller 7.

In step 19, the CPU 30 executes wireless communication disconnection processing. Then, the CPU 30 returns the processing to step 12 and the above-described processing is repeated. Hereinafter, with reference to FIG. 15, the wireless communication disconnection processing will be described in detail.

Referring to FIG. 15, the CPU 30 interrupts the game which is currently being processed (step 51), and stores the game state in the game state data Dg (step 52). Then, the CPU 30 advances the processing to the next step.

Then, the CPU 30 refers to the count value of the battery counter BC stored in the battery counter data De to determine whether or not the count value is 0 (step 53). When the count value of the battery counter BC is 0, the CPU 30 advances the processing to step 54. By contrast, when the count value of the battery counter BC is not 0 (i.e., when the count value is greater than 0), the CPU 30 advances the processing to step 55.

In step 54, the CPU 30 displays a notice image to urge the player to recover the wireless communication (FIG. 8) on the display screen of the monitor 2, and advances the processing to step 56. As described later in detail, the processing in step 54 is performed when the wireless communication between the controller 7 and the game apparatus main body 5 is disconnected for some reason. The game is temporarily interrupted, and a notice image to urge the player to recover the wireless communication is displayed.

In step 55, the CPU 30 displays a notice image to inform the player that the battery is running down and urge the player to check the remaining battery amount (FIG. 9) on the display screen of the monitor 2. Then, the CPU 30 advances the processing to step 56. As described later in detail, the processing in step 55 is performed when it is found that the battery is running down after the wireless communication, once disconnected, is recovered and then the wireless communication is disconnected again within a predetermined time period. The game is temporarily interrupted, and a notice image to inform the player that the battery is running down and urge the player to check the remaining battery amount is displayed.

The notice image to urge the player to recover the wireless communication in step 54 (FIG. 8), and the notice image to inform the player that the battery is running down and urge the player to check the remaining battery amount (FIG. 9), are displayed after the game is interrupted. Therefore, the game image provided by the game processing may be paused and kept displayed as the background of such a notice image. For example, in step 55, the letters of the notice indicating that the power of the controller 7 is insufficient is superimposed on the game image which is at a pause on the monitor 2.

In step 56, the CPU 30 waits for the wireless communication between the controller 7 and the game apparatus main body 5 to be recovered. For example, when the player presses the A button (operation button 72*d*) of the controller 7, the CPU 30 executes processing of establishing the wireless connection with the controller 7. Alternatively, the CPU 30 may execute the processing of establishing the wireless connection with the controller 7 without waiting for the operation by the player. When the wireless communication is recovered (Yes in step 56), the CPU 30 executes battery check processing and advances the processing to the next step. Hereinafter, with reference to FIG. 16, the battery check processing will be described in detail.

Referring to FIG. 16, the CPU 30 sets the count value of the check timer CT stored in the check timer data Df to 0 to update the check timer data Df (step 61) and advances the processing to the next step.

Next, the CPU 30 transmits a battery check instruction to the controller 7, the wireless communication with which has been recovered, to check the battery amount (step 62). Then, the CPU 30 advances the processing to the next step. For example, the CPU 30 transmits the battery check instruction to the controller 7 by executing a function of obtaining information on the controller 7 (controller ID, battery voltage data, etc.).

Then, the CPU 30 determines whether or not a check result has been received from the controller 7, to which the battery check instruction was transmitted (step 63). When the check result has been received from the controller 7, the CPU 30 advances the processing to step 66. By contrast, when the check result has not been received from the controller 7, the CPU 30 advances the processing to step 64.

In step 64, the CPU 30 adds 1 to the count value of the check timer CT stored in the check timer data Df to update the check timer data Df. The CPU 30 determines whether or not the count value of the check timer CT is greater than 300 (step 65). When the count value of the check timer CT is 300 or less, the CPU 30 returns the processing to step 63 and the above-described processing is repeated. By contrast, when the count value of the check timer CT is more than 300, the CPU 30 returns the processing to step 61 and the above-described processing is repeated. Owing to the processing in steps 61 through 65, the battery check instruction is transmitted for each 300 times of processing (in the case where the game processing cycle is 1/60 sec., every 5 seconds) until the game apparatus main body 5 receives the check result from the controller 7.

In step 66, the CPU 30 calculates the remaining battery amount using the battery voltage data included in the check result received from the controller 7. Based on the obtained battery voltage data and remaining battery amount data, the CPU 30 updates the battery voltage data Db and the remaining battery amount data Dc, and advances the processing to the next step. For example, the battery voltage data obtained from the controller 7 represents the battery voltage attached to the controller 7, which is represented with a value in the 256-scale range. The battery voltage is classified into one of the five stages (i.e.,evaluated), and thus the remaining battery amount data is calculated.

The CPU 30 determines whether or not the remaining battery amount of the controller 7 calculated in step 66 is equal to or less than a predetermined level (step 67). For example, when the remaining battery amount of the controller 7 is at the low level or the critical level, the CPU 30 sets the battery running-down flag FLB to ON and stores such a battery running-down flag FLB in the battery running-down flag Dd (step 68). Then, the CPU 30 terminates the battery check processing. When the remaining battery amount of the controller 7 is at highest level, the high level or the medium level, the CPU 30 sets the battery running-down flag FLB to OFF and stores such a battery running-down flag FLB in the battery running-down flag Dd (step 69). Then, the CPU 30 terminates the battery check processing.

In the above embodiment, the determination in step 67 is performed based on the level of the remaining battery amount as the criteria. Alternatively, the determination in step 67 may be performed based on the criteria using the voltage value represented by the battery voltage data obtained from the controller 7. For example, when the battery voltage of the controller 7 is less than a threshold value (for example, less than 2.40 V), the CPU 30 may execute the processing in step 68, where as when the battery voltage of the controller 7 is the threshold value or greater (for example, 2.40 V or greater), the CPU 30 may execute the processing in step 69.

In the processing in steps 67 through 69, only one threshold level is used for setting the battery running-down flag FLB to ON or OFF. Alternatively, a threshold level for switching the battery running-down flag FLB from OFF to ON and a threshold level for switching the battery running-down flag FLB from ON to OFF maybe separately set. For example, the threshold for switching the battery running-down flag FLB from ON to OFF may be set to be higher than the threshold level for switching the battery running-down flag FLB from OFF to ON. In this case, the battery running-down flag FLB is set to ON even if the battery voltage is temporarily recovered by a very small amount. Therefore, a recovery of an amount as small as an error is not considered as a proper recovery, and the battery voltage can be properly determined.

Returning to FIG. 15, after the battery check processing in step 57, the CPU 30 determines whether or not the battery running-down flag FLB stored in the battery running-down flag Dd is set to ON. When the battery running-down flag FLB is set to ON, the CPU 30 sets the count value of the battery counter BC to 1800 to update the battery counter data De (step 59). Then, the CPU 30 terminates the wireless communication disconnection processing. When the battery running-down flag FLB is set to OFF, the CPU 30 terminates the wireless communication disconnection processing.

The initial count value of the battery counter BC is 0 (see step 11 above). As is clear from the processing in steps 53 through 59, when the wireless communication is disconnected, if the remaining battery amount of the controller 7 is equal to or less than a predetermined level, the count value of the battery counter BC is set to 1800 and then is subtracted in step 15. If the wireless communication is disconnected again before the count value of the battery counter BC becomes 0, the notice image indicating that the battery is running down is displayed on the monitor 2.

As described above, the game apparatus 3 in this embodiment determines whether or not the battery is running down in combined consideration of the determinations on both the remaining battery amount of the controller 7 and the wireless communication state, not only one of these two factors, and then notifies the player that the battery is running down on the monitor 2. The player can check the remaining battery amount of his/her own controller 7 on the display screen by pressing a predetermined operation button on the controller 7. The image showing that the battery is running down is displayed on the display screen of the monitor 2 that the player is watching while playing the game. Therefore, it does not occur that the player keeps on playing without noticing that the battery is running down. In addition, the game is automatically interrupted and the game state at that point is stored. Therefore, it does not occur that the game proceeds until the player finishes replacing the dry battery or recharging the rechargeable battery, against the player's intention.

The following effects are expectable by determining whether or not the battery is running down in combined consideration of the determinations on both the remaining battery amount of the controller 7 and the wireless communication state. In the case where the controller 7 for operating the game apparatus main body 5 by wireless communication as described above is used, the first problem which occurs when the remaining battery amount is reduced is often a problem on the wireless communication (for example, the wireless communication is temporarily disconnected). The reason is that the battery consumption by the wireless communication is generally large. Therefore, the determination on the remaining battery amount is made in consideration of the wireless communication function. However, it is difficult to fix the remaining battery amount at which the wireless communication function is guaranteed. The reason is that the battery voltage at which the wireless communication is possible varies in accordance with the operation environment, differences among individual apparatuses and the like. For example, the battery voltage at which the wireless communication is possible varies in accordance with the distance between the controller 7 and the game apparatus main body 5.

For example, in the case where only the remaining battery amount data of the controller 7 is used to determine whether or not the battery is running down in the controller 7, if priority is put on guaranteeing the wireless communication function, the battery is determined to be running down even though the wireless communication between the controller 7 and the game apparatus main body 5 is still sufficiently possible. This wastes the battery amount. This method also requires to frequently check the battery voltage of the controller 7 and to transmit and receive the battery voltage data. As a result, the wireless communication band is suppressed, the processing load is increased, and the battery consumption is increased. If the level at which the wireless communication function of the controller 7 is stopped is determined based on the remaining battery amount, the wireless communication cannot be expected to be recovered after the battery is determined to be running down. Therefore, the above-described operation cannot be provided. Even the final result of the battery voltage checking may not be transmitted from the controller 7 to the game apparatus main body 5.

In the case where only the wireless communication state between the controller 7 and the game apparatus main body 5 is used to determine whether or not the battery of the controller 7 is running down, it is very difficult to make a correct determination on the remaining battery amount. The reason is that the wireless communication may be disconnected for other causes than the insufficient remaining battery amount, as described above.

By contrast, the game apparatus main body 5 in this embodiment confirms that the remaining battery amount of the controller 7 has declined to the threshold level or lower, and then confirms that at such a level, the wireless communication maybe disconnected a plurality of times under the current operation environment (intermittent disconnection within a predetermined time period). Thus, it is determined that the remaining battery amount is insufficient based on that the wireless communication has been disconnected and that the remaining battery amount has been lowered to the predetermined level or lower. Therefore, the power insufficiency of the controller 7 can be properly determined in accordance with the current use environment. As described above, if it is determined that the power is insufficient only based on the remaining battery amount, a correct determination may not be provided due to the difference among individual apparatuses or the state of use. In that case, the battery is not used even though there is still a usable battery amount. If it is determined that the power is insufficient only based on that the wireless communication has been disconnected, a correct determination may not be provided because of the use environment. In that case also, the battery is not used even if the there is still a sufficient usable battery amount. For example, when the distance between the controller 7 and the game apparatus main body 5 is short, the wireless communication is possible with a relatively low battery voltage. Under this environment, the battery can be efficiently used until it becomes impossible to stably provide the level of battery voltage required for such an environment.

The game apparatus 3 according to this embodiment checks the battery voltage of the controller 7 or transmits and receives the battery voltage data at the time of initial setting and when the wireless communication is disconnected, not for each cycle of game processing. Therefore, the suppression of the wireless communication band, the processing load and the battery consumption of the controller 7 can be alleviated. When such effects are not necessary, checking on the battery voltage of the controller 7, and transmission or receiving of the battery voltage data, may be repeated appropriately, for example, for each predetermined cycle.

In the case where checking on the battery voltage of the controller 7, or transmission or receiving of the battery voltage data, is repeated appropriately, the notice that the battery is running down described above can be provided even if the wireless communication between the controller 7 and the game apparatus main body 5 is continuously disconnected. For example, when the wireless communication is not recovered for a predetermined time period in step 56, the CPU 30 determines that the wireless communication is in continuous disconnection. When the wireless communication is in continuous disconnection and further the latest obtained battery voltage data indicates that the remaining battery amount is equal to or less than a predetermined level, the CPU 30 displays the notice that the battery is running down in step 55. In this case, the image notifying the player that the wireless communication is disconnected (FIG. 8) is displayed on the monitor 2, and then an image to notify the player that the battery is running down and urge to replace the battery is displayed in a predetermined time period. By this method for determining whether or not the battery is running down, it can be properly determined that the continuous disconnection is occurred by the insufficient remaining battery amount of the controller 7.

In step 11 described above, the remaining battery amount of the controller 7 is checked in the initial processing. By this initial checking on the remaining battery amount, the battery voltage of all the controllers 7 connected to the game apparatus main body 5 can be initially obtained. Therefore, when the player displays the HOME button menu upon being urged to check the remaining battery amount because the wireless communication between his/her controller 7 and the game apparatus main body 5 is disconnected, a remaining battery amount checking image can be displayed for all the controllers 7. When such an effect is not required, it is not necessary to check the remaining battery amount in the initial processing. For example, if, when the wireless communication with a controller 7 is disconnected and it is urged to check the remaining battery amount of the controller 7, a remaining battery amount checking image which shows the remaining battery amount of only this controller 7 is to be displayed in the HOME button menu, the remaining battery amount may be checked only when the wireless communication is disconnected. In this case also, the present invention is realized.

In the above embodiment, the controller 7 checks the battery voltage, whereas the game apparatus main body 5 performs the five stage evaluation on the remaining battery amount and sets the battery running-down flag. The operations may be performed in other embodiments. For example, the controller 7 may check the battery voltage, perform the five stage evaluation on the remaining battery amount, and set the battery running-down flag. In this case, data representing the battery running-down flag is transmitted from the controller 7 to the game apparatus main body 5. Alternatively, the controller 7 may check the battery voltage and perform the five stage evaluation on the remaining battery amount, whereas the game apparatus main body 5 may set the battery running-down flag. In this case, the five stage evaluation representing the remaining battery amount (remaining battery amount data) is transmitted from the controller 7 to the game apparatus main body 5. The five stage evaluation may be omitted. In this case, the controller 7 checks the battery voltage, and the game apparatus main body 5 directly sets the battery running-down flag using the battery voltage data transmitted thereto. The controller 7 may check the battery voltage and set the battery running-down flag, with the five stage evaluation being omitted. In this case, data representing the battery running-down flag is transmitted from the controller 7 to the game apparatus main body 5.

In the above embodiment, it is notified to the player that the battery in the controller 7 is running down through the display of such an image on the monitor 2. The notification may be provided by any other method. For example, an audio signal or a sound effect indicating that the battery in the controller 7 is running down may be output from the speakers 2a of the monitor 2, the speaker 706 of the controller 7 or other speaker controllable by the game apparatus main body 5.

In the above embodiment, the game apparatus main body 5 for executing the remaining battery amount checking processing according to the present invention is included in the game system 1. The game apparatus main body 5 may be included in a general personal computer or other information processing apparatuses.

The shape of the controller 7, and the shape, number, position and the like of the operation section 72, are merely illustrative and may be modified according to the present invention.

The game program according to the present invention may be supplied to the game apparatus main body 5 via a wired or wireless communication line instead of via an external storage medium such as the optical disc 4 or the like. The game program may be stored on a nonvolatile storage medium in the game apparatus main body 5 in advance. The information storage medium for storing the game program may be a CD-ROM, a DVD, a similar optical disc-shaped storage medium or a nonvolatile semiconductor memory.

A storage medium having a game program stored thereon and a game apparatus according to the present invention can properly determine that the battery in the input device is running down, and are useful for a game apparatus or a game program used for a game apparatus main body or the like and an input device or the like which are connected to each other by wireless communication.

While the invention has been described in detail, the foregoing description is in all aspects illustrative and not restrictive. It is understood that numerous other modifications and variations can be devised without departing from the scope of the invention.

What is claimed is:

1. A storage medium having a game program stored thereon executable by a computer of a game apparatus wirelessly communicably connected to an input device including an electronic circuit having a wireless communication function and a battery for providing power to the electronic circuit, wherein the game program causes the computer to act as:
   disconnection detection means for detecting at least one of continuous disconnection, intermittent disconnection, and temporary disconnection, of wireless communication between the input device and the game apparatus;
   remaining battery amount data obtaining means for obtaining remaining battery amount data representing a remaining battery amount of the input device via the wireless communication;
   power insufficiency determination means for determining that the power of the input device is insufficient based on that the wireless communication is detected to be disconnected by the disconnection detection means and that the remaining battery amount data obtained by the remaining battery amount data obtaining means represents a remaining battery amount of a predetermined level or lower; and
   notification means for, when the power insufficiency determination means determines that the power is insufficient, notifying the power insufficiency.

2. A storage medium according to claim 1, wherein the power insufficiency determination means determines that the power of the input device is insufficient when the disconnection detection means detects the temporary disconnection of the wireless communication, the remaining battery amount data obtained by the remaining battery amount data obtaining means represents a remaining battery amount of a predetermined level or lower, and further the disconnection detection means detects that the wireless communication is disconnected the second time within a predetermined time period after the temporary disconnection.

3. A storage medium according to claim 1, wherein:
   the disconnection detection means detects the temporary disconnection of the wireless communication; and
   the remaining battery amount data obtaining means obtains the remaining battery amount data from the input device only immediately after the disconnection detection means detects the temporary disconnection.

4. A storage medium according to claim 3, wherein:
   the power insufficiency determination means determines that the power of the input device is insufficient when the disconnection detection means detects the temporary disconnection of the wireless communication, the remaining battery amount data obtained by the remaining battery amount data obtaining means represents a remaining battery amount of a predetermined level or lower, and further the disconnection detection means detects that the wireless communication is disconnected the second time within a predetermined time period after the temporary disconnection.

5. A storage medium according to claim 1, wherein:
   the disconnection detection means detects the intermittent disconnection of the wireless communication during a predetermine time period; and
   the power insufficiency determination means determines that the power of the input device is insufficient when the disconnection detection means detects the intermittent disconnection of the wireless communication, and the remaining battery amount data obtained by the remaining battery amount data obtaining means represents a remaining battery amount of a predetermined level or lower.

6. A storage medium according to claim 1, wherein:
   the remaining battery amount obtaining means obtains the remaining battery amount data representing the remaining battery amount of the input device repeatedly as necessary via the wireless communication; and
   the power insufficiency determination means determines that the power of the input device is insufficient when the disconnection detection means detects the continuous disconnection of the wireless communication, and the latest remaining battery amount data obtained by the remaining battery amount data obtaining means represents a remaining battery amount of a predetermined level or lower.

7. A storage medium according to claim 1, wherein when the power insufficiency determination means determines that the power is insufficient, the notification means interrupts game processing which is being executed, stores game state data representing a state of the game in execution on a memory included in the game apparatus, and notifies that the power is insufficient by displaying a message indicating the power insufficiency on a display device with a game image provided by the game processing being stopped.

8. A storage medium according to claim 1, wherein the notification means displays, on a display device for displaying a game image of a game which is being executed by the game apparatus, an image indicating that the power of the input device is insufficient.

9. A storage medium according to claim 1, wherein the notification means outputs an audio signal or a sound effect indicating that the power of the input device is insufficient through a speaker controllable by the game apparatus.

10. A game apparatus wirelessly communicably connected to an input device including an electronic circuit having a wireless communication function and a battery for providing power to the electronic circuit, the apparatus comprising:
    wireless communication means for wirelessly communicating with the input device;
    disconnection detection means for detecting at least one of continuous disconnection, intermittent disconnection, and temporary disconnection, of wireless communication with the input device;
    remaining battery amount data obtaining means for obtaining remaining battery amount data representing a remaining battery amount of the input device via the wireless communication;
    power insufficiency determination means for determining that the power of the input device is insufficient based on that the wireless communication is detected to be disconnected by the disconnection detection means and that the remaining battery amount data obtained by the remaining battery amount data obtaining means represents a remaining battery amount of a predetermined level or lower; and notification means for, when the power insufficiency determination means determines that the power is insufficient, notifying the power insufficiency.

11. A game apparatus according to claim 10, wherein the power insufficiency determination means determines that the power of the input device is insufficient when the disconnection detection means detects the temporary disconnection of the wireless communication, the remaining battery amount data obtained by the remaining battery amount data obtaining means represents a remaining battery amount of a predetermined level or lower, and further the disconnection detection means detects that the wireless communication is disconnected the second time within a predetermined time period after the temporary disconnection.

12. A game apparatus medium according to claim 10, wherein:
the disconnection detection means detects the temporary disconnection of the wireless communication; and
the remaining battery amount data obtaining means obtains the remaining battery amount data from the input device only immediately after the disconnection detection means detects the temporary disconnection.

13. A game apparatus medium according to claim 12, wherein:
the power insufficiency determination means determines that the power of the input device is insufficient when the disconnection detection means detects the temporary disconnection of the wireless communication, the remaining battery amount data obtained by the remaining battery amount data obtaining means represents a remaining battery amount of a predetermined level or lower, and further the disconnection detection means detects that the wireless communication is disconnected the second time within a predetermined time period after the temporary disconnection.

14. A game apparatus according to claim 10, wherein:
the disconnection detection means detects the intermittent disconnection of the wireless communication during a predetermine time period; and
the power insufficiency determination means determines that the power of the input device is insufficient when the disconnection detection means detects the intermittent disconnection of the wireless communication, and the remaining battery amount data obtained by the remaining battery amount data obtaining means represents a remaining battery amount of a predetermined level or lower.

15. A game apparatus medium according to claim 10, wherein:
the remaining battery amount obtaining means obtains the remaining battery amount data representing the remaining battery amount of the input device repeatedly as necessary via the wireless communication; and
the power insufficiency determination means determines that the power of the input device is insufficient when the disconnection detection means detects the continuous disconnection of the wireless communication, and the latest remaining battery amount data obtained by the remaining battery amount data obtaining means represents a remaining battery amount of a predetermined level or lower.

16. A game apparatus medium according to claim 10, wherein when the power insufficiency determination means determines that the power is insufficient, the notification means interrupts game processing which is being executed, stores game state data representing a state of the game in execution on a memory included in the game apparatus, and notifies that the power is insufficient by displaying a message indicating the power insufficiency on a display device with a game image provided by the game processing being stopped.

17. A game apparatus according to claim 10, wherein the notification means displays, on a display device for displaying a game image of a game which is being executed by the game apparatus, an image indicating that the power of the input device is insufficient.

18. A game apparatus according to claim 10, wherein the notification means outputs an audio signal or a sound effect indicating that the power of the input device is insufficient through a speaker controllable by the game apparatus.

* * * * *